United States Patent
Ichimaru

(10) Patent No.: US 11,956,316 B2
(45) Date of Patent: Apr. 9, 2024

(54) VEHICLE-MOUNTED APPARATUS, VEHICLE-MOUNTED COMMUNICATION SYSTEM, AND COMMUNICATION MANAGEMENT METHOD

(71) Applicant: Sumitomo Electric Industries, Ltd., Osaka (JP)

(72) Inventor: Toshihiro Ichimaru, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 147 days.

(21) Appl. No.: 17/764,535

(22) PCT Filed: Aug. 31, 2020

(86) PCT No.: PCT/JP2020/032801
§ 371 (c)(1),
(2) Date: Mar. 29, 2022

(87) PCT Pub. No.: WO2021/065281
PCT Pub. Date: Apr. 8, 2021

(65) Prior Publication Data
US 2023/0021603 A1 Jan. 26, 2023

(30) Foreign Application Priority Data
Oct. 3, 2019 (JP) .................. 2019-182571

(51) Int. Cl.
*H04L 67/12* (2022.01)
*H04B 1/3822* (2015.01)
*H04B 3/04* (2006.01)

(52) U.S. Cl.
CPC .......... *H04L 67/12* (2013.01); *H04B 1/3822* (2013.01); *H04B 3/04* (2013.01)

(58) Field of Classification Search
CPC ......... H04L 67/12; H04L 12/28; H04L 25/03; H04B 1/3822; H04B 3/04; B60R 16/023; B60R 16/0231; H04W 4/48
See application file for complete search history.

(56) References Cited

U.S. PATENT DOCUMENTS

| | | |
|---|---|---|
| 6,590,930 B1 | 7/2003 | Greiss |
| 2011/0080237 A1 | 4/2011 | Fratti et al. |
| 2012/0320210 A1* | 12/2012 | Imai ............... B60W 30/12 348/148 |
| 2016/0241422 A1 | 8/2016 | Akita et al. |
| 2016/0253902 A1* | 9/2016 | Yokoi ............... G08G 1/143 348/149 |
| 2016/0272065 A1* | 9/2016 | Tsushima ............ B60R 1/00 |

(Continued)

FOREIGN PATENT DOCUMENTS

| | | |
|---|---|---|
| JP | 10-307592 A | 11/1998 |
| JP | 2002-511214 A | 4/2002 |

(Continued)

*Primary Examiner* — Dac V Ha
(74) *Attorney, Agent, or Firm* — XSENSUS LLP

(57) ABSTRACT

A vehicle-mounted apparatus is a vehicle-mounted apparatus mounted in a vehicle, and includes a measuring unit that measures characteristics of a transmission line in a vehicle-mounted network mounted in the vehicle, and an identifying unit that identifies the transmission line based on the characteristics measured by the measuring unit.

17 Claims, 11 Drawing Sheets

(56) References Cited

U.S. PATENT DOCUMENTS

2021/0274130 A1* 9/2021 Nodder ............ G08B 13/19695
2023/0311790 A1* 10/2023 Sandu ..................... B60P 3/343
701/2

FOREIGN PATENT DOCUMENTS

| | | | |
|---|---|---|---|
| JP | 2011-199822 | A | 10/2011 |
| JP | 2015-216613 | A | 12/2015 |
| JP | 2016-163117 | A | 9/2016 |
| JP | 2017-92621 | A | 5/2017 |
| WO | 1998/57438 | A1 | 12/1998 |
| WO | 2007/013361 | A1 | 2/2007 |
| WO | 2015/052879 | A1 | 4/2015 |

* cited by examiner

FIG. 6

| MANUFACTURER OF COMPENSATION CIRCUIT | MANUFACTURER OF FRONT-END CIRCUIT | MANUFACTURER OF COMMUNICATION PORT | MANUFACTURER OF SLAVE APPARATUS | TARGET ETHERNET CABLE IDENTIFICATION RESULT | | OPERATION PARAMETER |
|---|---|---|---|---|---|---|
| | | | | MANUFACTURER OF TARGET ETHERNET CABLE | ROUTING STATE OF TARGET ETHERNET CABLE | |
| COMPANY A | COMPANY A | COMPANY A | COMPANY A | COMPANY A | LENGTH 5 m - 10 m | CORRECTION UNREQUIRED |
| COMPANY A | COMPANY A | COMPANY A | COMPANY A | COMPANY A | LENGTH 10 m - 15 m | CORRECTION PARAMETER A |
| : | : | : | : | : | : | : |
| COMPANY A | COMPANY A | COMPANY A | COMPANY A | COMPANY A | LENGTH 5 m - 10 m, WITH BENDING OF R 0.1 TO R 0.2 m | CORRECTION PARAMETER B |
| : | : | : | : | : | : | : |
| COMPANY A | COMPANY A | COMPANY A | COMPANY A | COMPANY A | LENGTH 5 m - 10 m, WITH 1N TO 5N BINDING PORTIONS | CORRECTION PARAMETER C |
| : | : | : | : | : | : | : |
| COMPANY A | COMPANY A | COMPANY A | COMPANY A | COMPANY A | LENGTH 5 m - 10 m, RUN PARALLEL WITH FIVE TO TEN CABLES | CORRECTION PARAMETER D |
| : | : | : | : | : | : | : |
| COMPANY A | COMPANY A | COMPANY A | COMPANY A | COMPANY A | LENGTH 5 m - 10 m, WITH ONE TO THREE RELAY PORTIONS | CORRECTION PARAMETER E |
| : | : | : | : | : | : | : |
| COMPANY A | COMPANY A | COMPANY B | COMPANY A | COMPANY A | LENGTH 5 m - 10 m | CORRECTION PARAMETER F |
| : | : | : | : | : | : | : |

FIG. 7

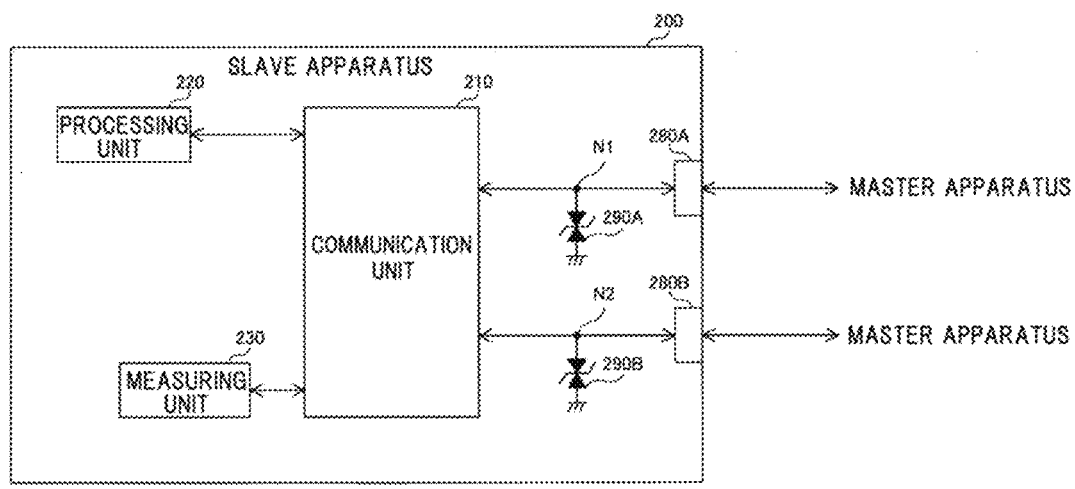

FIG. 12

| MANUFACTURER OF COMPENSATION CIRCUIT | MANUFACTURER OF FRONT-END CIRCUIT | MANUFACTURER OF COMMUNICATION PORT | MANUFACTURER OF VEHICLE-MOUNTED APPARATUS | TEMPERATURE OF VEHICLE-MOUNTED APPARATUS | IDs OF VEHICLE-MOUNTED APPARATUSES CONNECTED BY ETHERNET CABLE | OUTSIDE-VEHICLE ENVIRONMENT | ETHERNET CABLE IDENTIFICATION RESULT ||| OPERATION PARAMETER |
|---|---|---|---|---|---|---|---|---|---|---|
| | | | | | | | MANUFACTURER OF ETHERNET CABLE | ROUTING STATE OF ETHERNET CABLE | | |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 5 m TO 10 m | | CORRECTION UNREQUIRED |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 10 m TO 15 m | | CORRECTION PARAMETER A |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 5 m TO 10 m, WITH BENDING OF R 0.1 TO R 0.2 m | | CORRECTION PARAMETER B |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 5 m TO 10 m, WITH 10 TO 20 BENDING PORTIONS | | CORRECTION PARAMETER C |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 5 m TO 10 m, RUN PARALLEL WITH FIVE TO TEN CABLES | | CORRECTION PARAMETER D |
| COMPANY A | COMPANY A | COMPANY A | COMPANY A | 20°C ~ 30°C | VEHICLE-MOUNTED APPARATUSES A AND VEHICLE-MOUNTED APPARATUS B | 10°C~20°C, 15g/m³~25g/m³ | COMPANY A | LENGTH 5 m TO 10 m, WITH ONE TO THREE RELAY PORTIONS | | CORRECTION PARAMETER E |
| COMPANY A | COMPANY A | COMPANY B | | | | | COMPANY A | LENGTH 5 m TO 10 m | | CORRECTION PARAMETER F |

VEHICLE-MOUNTED APPARATUS, VEHICLE-MOUNTED COMMUNICATION SYSTEM, AND COMMUNICATION MANAGEMENT METHOD

CROSS-REFERENCE TO RELATED APPLICATIONS

The present application is based on PCT/JP2020/032801 filed on Aug. 31, 2020, which claims priority to Japanese Application No. 2019-182571, filed on Oct. 3, 2019, the entire contents of each are incorporated herein by reference.

TECHNICAL FIELD

The present disclosure relates to a vehicle-mounted apparatus, a vehicle-mounted communication system, and a communication management method.

BACKGROUND ART

PTL 1 (Japanese Unexamined Patent Application Publication No. 2017-092621) discloses a communication device as follows. That is, the communication device includes a deterioration diagnosis unit that diagnoses deterioration of a communication system configured via a wired or wireless transmission line, and a deterioration prediction unit that predicts deterioration of the communication system on the basis of a diagnosis result of the deterioration diagnosis unit.

In addition, PTL 2 (International Publication No. 2015/052879) discloses a distortion compensation system as follows. That is, the distortion compensation system includes: a first communication node (4, 104, 204) including a first receiving unit (13, 113) provided with an equalizer (12, 112) configured using a first digital filter (FF1, FB1, FF101), and a first transmitting unit (10, 110) provided with an emphasis circuit (8, 108) configured using a second digital filter (FF2, FB2, FF102); and a second communication node (5, 105, 205a) including a second transmitting unit (23) that transmits a predetermined training pattern to the first communication node through a first transmission line (6, 6a, 206a) before receiving normal data from the first transmitting unit of the first communication node, wherein: the first communication node receives, with the first receiving unit, a training pattern transmitted by the second transmitting unit of the second communication node; the equalizer allows a filter constant of the first digital filter to converge so as to be able to receive the training pattern by having an error of the training pattern converge; and the first transmitting unit of the first communication node compensates for distortion and transmits normal data by using the filter constant of the first digital filter that has converged as at least part of a filter constant of the second digital filter of the emphasis circuit.

CITATION LIST

Patent Literature

PTL 1: Japanese Unexamined Patent Application Publication No. 2017-092621
PTL 2: International Publication No. 2015/052879

SUMMARY OF INVENTION

A vehicle-mounted apparatus of the present disclosure is a vehicle-mounted apparatus mounted in a vehicle, and includes a measuring unit that measures characteristics of a transmission line in a vehicle-mounted network mounted in the vehicle, and an identifying unit that identifies the transmission line based on the characteristics measured by the measuring unit.

A vehicle-mounted communication system of the present disclosure includes a first vehicle-mounted apparatus mounted in a vehicle, and a second vehicle-mounted apparatus mounted in the vehicle, wherein: the first vehicle-mounted apparatus and the second vehicle-mounted apparatus are connected via a transmission line in a vehicle-mounted network mounted in the vehicle; the first vehicle-mounted apparatus transmits a target signal to the second vehicle-mounted apparatus via the transmission line; the second vehicle-mounted apparatus measures the target signal received from the first vehicle-mounted apparatus, and transmits a response signal indicating a measurement result to the first vehicle-mounted apparatus; the first vehicle-mounted apparatus measures characteristics of the transmission line based on the response signal received from the second vehicle-mounted apparatus; and the first vehicle-mounted apparatus identifies the transmission line based on the measured characteristics.

A communication management method of the present disclosure is a communication management method for a vehicle-mounted apparatus mounted in a vehicle, and includes the steps of measuring characteristics of a transmission line in a vehicle-mounted network mounted in the vehicle, and identifying the transmission line based on the measured characteristics.

A communication management method of the present disclosure is a communication management method for a vehicle-mounted communication system including a first vehicle-mounted apparatus mounted in a vehicle and a second vehicle-mounted apparatus mounted in the vehicle, the first vehicle-mounted apparatus and the second vehicle-mounted apparatus being connected via a transmission line in a vehicle-mounted network mounted in the vehicle, and the method includes the steps of: transmitting, by the first vehicle-mounted apparatus, a target signal to the second vehicle-mounted apparatus via the transmission line; transmitting, by the second vehicle-mounted apparatus, a response signal indicating a measurement result of the target signal received from the first vehicle-mounted apparatus to the first vehicle-mounted apparatus; measuring, by the first vehicle-mounted apparatus, characteristics of the transmission line based on the measurement result received from the second vehicle-mounted apparatus, and identifying, by the first vehicle-mounted apparatus, the transmission line based on the measured characteristics.

An aspect of the present disclosure may be realized as a semiconductor integrated circuit that partially or entirely realizes a vehicle-mounted apparatus. In addition, an aspect of the present disclosure may be realized as a program for causing a computer to execute the steps of a process in a vehicle-mounted apparatus.

In addition, an aspect of the present disclosure may be realized as a semiconductor integrated circuit that partially or entirely realizes a vehicle-mounted communication system. In addition, an aspect of the present disclosure may be realized as a program for causing a computer to execute the steps of a process in a vehicle-mounted communication system.

BRIEF DESCRIPTION OF DRAWINGS

FIG. 6 is a diagram illustrating an example of correspondence information in a storage unit according to the first embodiment of the present disclosure.

FIG. 7 is a diagram illustrating an example of the configuration of a slave apparatus according to the first embodiment of the present disclosure.

FIG. 12 is a diagram illustrating an example of correspondence information in a server of the communication system according to the second embodiment of the present disclosure.

DESCRIPTION OF EMBODIMENTS

Figure 1:
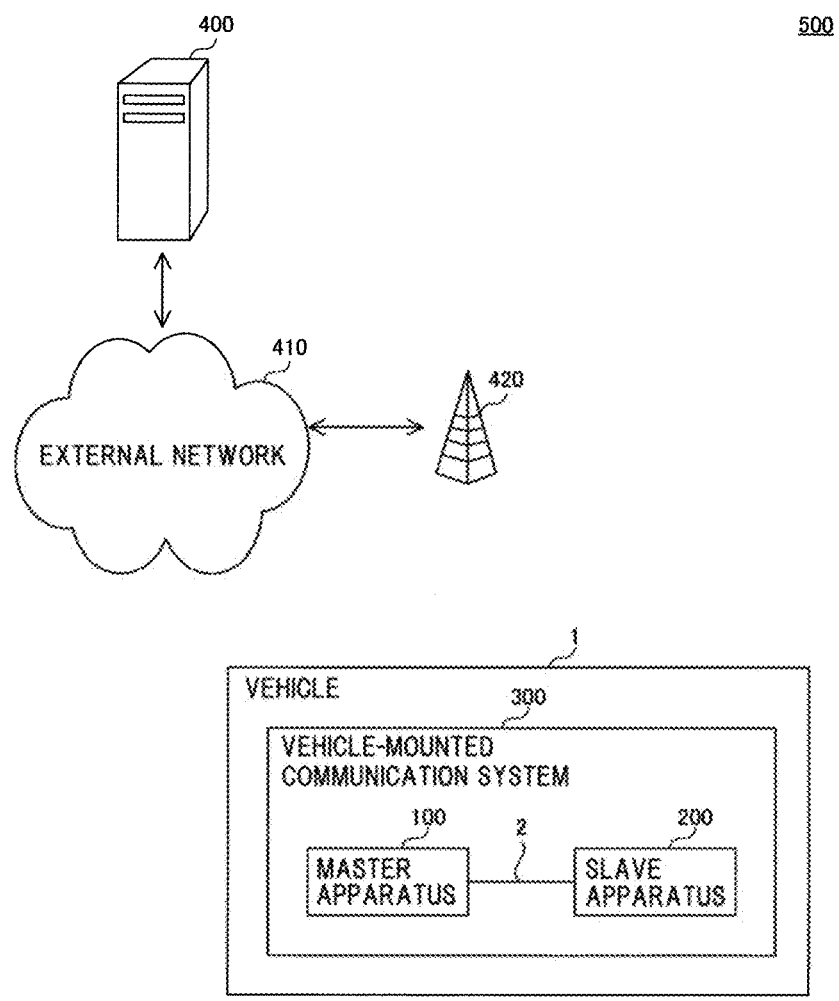
FIG. 1 is a diagram illustrating the configuration of a communication system according to a first embodiment of the present disclosure.

Hitherto, various functions regarding a transmission line in a vehicle-mounted network have been developed.

Problems to be Solved by Present Disclosure

Technology capable of improving functions regarding a transmission line in a vehicle-mounted network is desired.

To solve the above-mentioned problems, it is an object of the present disclosure to provide a vehicle-mounted apparatus, a vehicle-mounted communication system, and a communication management method capable of improving functions regarding a transmission line in a vehicle-mounted network.

Advantageous Effects of Present Disclosure

According to the present disclosure, functions regarding a transmission line in a vehicle-mounted network may be improved.

Description of Embodiments of Present Disclosure

At first, the contents of embodiments of the present disclosure will be listed and described.

(1) A vehicle-mounted apparatus according to an embodiment of the present disclosure is a vehicle-mounted apparatus mounted in a vehicle, and includes a measuring unit that measures characteristics of a transmission line in a vehicle-mounted network mounted in the vehicle, and an identifying unit that identifies the transmission line based on the characteristics measured by the measuring unit.

As mentioned above, with the configuration of identifying a transmission line in a vehicle-mounted network based on the characteristics of the transmission line, namely, the result of measuring the electrical characteristics of a low layer, the components and the like of the transmission line may be identified, and various appropriate processes and so forth in accordance with the identification result may be implemented. Therefore, functions regarding the transmission line in the vehicle-mounted network may be improved.

(2) Preferably, the vehicle-mounted apparatus further includes a communication unit that communicates with another vehicle-mounted apparatus via the transmission line, and an adjusting unit that, based on an identification result of the identifying unit, performs adjustment processing to adjust at least either of a transmission operation and a reception operation of a communication signal by the communication unit.

With such a configuration, the frequency characteristics of the transmission line in the band of a communication signal, for example, may be compensated for in accordance with the identification result. Accordingly, the communication quality of the vehicle-mounted network may be improved.

(3) More preferably, the adjusting unit adjusts the transmission operation and the reception operation in the adjustment processing.

With such a configuration, both the quality of a communication signal to be transmitted from the first vehicle-mounted apparatus, which is an example of a vehicle-mounted apparatus, to the second vehicle-mounted apparatus, which is another example of a vehicle-mounted apparatus, and the quality of a communication signal to be transmitted from the second vehicle-mounted apparatus to the first vehicle-mounted apparatus may be improved. Accordingly, the quality of communication between the first vehicle-mounted apparatus and the second vehicle-mounted apparatus may be further improved.

(4) More preferably, the vehicle-mounted apparatus further includes a storage unit that stores correspondence information indicating a corresponding relationship between the identification result and an operation parameter regarding the adjustment processing, and the adjusting unit performs the adjustment processing using the correspondence information.

With such a configuration, adjustment processing may be performed using a pre-generated corresponding relationship between an identification result and an operation parameter. Accordingly, the adjustment processing may be simplified.

(5) More preferably, the communication unit is further capable of communicating with outside of the vehicle, and the vehicle-mounted apparatus further includes an updating unit that updates the correspondence information based on information received from the outside of the vehicle via the communication unit.

With such a configuration, a verification result in another vehicle, for example, may be reflected in the adjustment processing in the local vehicle. Accordingly, the accuracy of the adjustment processing by the adjusting unit may be improved.

(6) More preferably, the adjusting unit obtains an evaluation result regarding quality of communication by the communication unit from the communication unit, updates correspondence information indicating a corresponding relationship between the identification result and an operation parameter regarding the adjustment processing based on the obtained evaluation result, and performs the adjustment processing using the updated correspondence information, and the communication unit transmits the updated correspondence information to an apparatus outside the vehicle.

As mentioned above, with the configuration of updating correspondence information in a vehicle-mounted apparatus of the local vehicle and transmitting the updated correspondence information to an apparatus outside the vehicle, the correspondence information may be updated by taking into consideration the inside-vehicle environment of the local vehicle, and, for example, the updated correspondence information may be reflected in adjustment processing in another vehicle.

(7) A vehicle-mounted communication system according to an embodiment of the present disclosure includes a first vehicle-mounted apparatus mounted in a vehicle and a second vehicle-mounted apparatus mounted in the vehicle, wherein: the first vehicle-mounted apparatus and the second vehicle-mounted apparatus are connected via a transmission line in a vehicle-mounted network mounted in the vehicle; the first vehicle-mounted apparatus transmits a target signal to the second vehicle-mounted apparatus via the transmission line; the second vehicle-mounted apparatus measures the target signal received from the first vehicle-mounted apparatus, and transmits a response signal indicating a measurement result to the first vehicle-mounted apparatus; the first vehicle-mounted apparatus measures characteristics of the transmission line based on the response signal received from the second vehicle-mounted apparatus; and the first vehicle-mounted apparatus identifies the transmission line based on the measured characteristics.

As mentioned above, with the configuration of identifying a transmission line that connects the first vehicle-mounted apparatus and the second vehicle-mounted apparatus in the vehicle-mounted network on the basis of the characteristics of the transmission line, namely, the result of measuring the electrical characteristics of a low layer, the components and the like of the transmission line between the first vehicle-mounted apparatus and the second vehicle-mounted apparatus may be identified, and various appropriate processes and so forth in accordance with the identification result may be implemented. Therefore, functions regarding the transmission line in the vehicle-mounted network may be improved.

(8) A communication management method according to an embodiment of the present disclosure is a communication management method for a vehicle-mounted apparatus mounted in a vehicle, and includes the steps of measuring characteristics of a transmission line in a vehicle-mounted network mounted in the vehicle, and identifying the transmission line based on the measured characteristics.

As mentioned above, with the method of identifying a transmission line in a vehicle-mounted network on the basis of the characteristics of the transmission line, namely, the result of measuring the electrical characteristics of a low layer, the components and the like of the transmission line may be identified, and various appropriate processes and so forth in accordance with the identification result may be implemented. Therefore, functions regarding the transmission line in the vehicle-mounted network may be improved.

(9) A communication management method according to an embodiment of the present disclosure is a communication management method for a vehicle-mounted communication system including a first vehicle-mounted apparatus mounted in a vehicle and a second vehicle-mounted apparatus mounted in the vehicle, the first vehicle-mounted apparatus and the second vehicle-mounted apparatus being connected via a transmission line in a vehicle-mounted network mounted in the vehicle, and the method includes the steps of: transmitting, by the first vehicle-mounted apparatus, a target signal to the second vehicle-mounted apparatus via the transmission line; transmitting, by the second vehicle-mounted apparatus, a response signal indicating a measurement result of the target signal received from the first vehicle-mounted apparatus to the first vehicle-mounted apparatus; measuring, by the first vehicle-mounted apparatus, characteristics of the transmission line based on the measurement result received from the second vehicle-mounted apparatus; and identifying, by the first vehicle-mounted apparatus, the transmission line based on the measured characteristics.

As mentioned above, with the method of identifying a transmission line that connects the first vehicle-mounted apparatus and the second vehicle-mounted apparatus in the vehicle-mounted network on the basis of the characteristics of the transmission line, namely, the result of measuring the electrical characteristics of a low layer, the components and the like of the transmission line between the first vehicle-mounted apparatus and the second vehicle-mounted apparatus may be identified, and various appropriate processes and so forth in accordance with the identification result may be implemented. Therefore, functions regarding the transmission line in the vehicle-mounted network may be improved.

Hereinafter, embodiments of the present disclosure will be described using the drawings. Note that the same or corresponding portions in the drawings will be denoted by the same reference symbol, and a repeated description thereof will not be given. In addition, at least some portions of the embodiments described below may be arbitrarily combined.

First Embodiment

[Vehicle-Mounted Communication System]

FIG. 1 is a diagram illustrating the configuration of a communication system according to a first embodiment of the present disclosure.

Referring to FIG. 1, a communication system 500 includes a server 400, and one or more vehicle-mounted communication systems 300. Each vehicle-mounted communication system 300 is mounted in a vehicle 1.

The vehicle-mounted communication system 300 includes a master apparatus 100 and a slave apparatus 200. The master apparatus 100 is an example of a first vehicle-mounted apparatus. The slave apparatus 200 is an example of a second vehicle-mounted apparatus. The master apparatus 100 and the slave apparatus 200 are mounted in the vehicle 1.

The master apparatus 100 and the slave apparatus 200 are connected via a transmission line 2 in a vehicle-mounted network mounted in the vehicle 1.

Note that the vehicle-mounted communication system 300 may be configured in such a manner that plural slave apparatuses 200 are connected to a single master apparatus 100 via respective transmission lines 2, or plural master apparatuses 100 are connected to a single slave apparatus 200 via respective transmission lines 2.

The master apparatus 100 and the slave apparatus 200 are capable of performing communication via the transmission line 2.

The transmission line 2 includes, for example, a connector capable of connecting to the master apparatus 100, a connector capable of connecting to the slave apparatus 200, and a cable capable of transmitting various signals. The transmission line 2 is, for example, a differential transmission line. Specifically, the transmission line 2 is an Ethernet (registered trademark) cable, for example.

The master apparatus 100 measures the characteristics of the transmission line 2. More specifically, the master apparatus 100 measures the characteristic impedance of the transmission line 2 or the insertion loss of the transmission line 2.

For example, the master apparatus 100 uses a technique according to TDR (Time Domain Reflectometry) to measure the characteristic impedance of the transmission line 2.

Alternatively, for example, the master apparatus 100 transmits a plurality of target signals with different frequencies to the slave apparatus 200 via the transmission line 2. The master apparatus 100 transmits, for example, later-described measurement signals or communication signals as target signals to the slave apparatus 200.

For example, the slave apparatus 200 measures the target signals received from the master apparatus 100, and transmits response signals indicating the measurement results to the master apparatus 100.

On the basis of the response signals received from the slave apparatus 200, the master apparatus 100 measures the characteristics, such as the insertion loss, of the transmission line 2. More specifically, the master apparatus 100 uses target signals transmitted by itself and response signals received from the slave apparatus 200 to measure the insertion loss of the transmission line 2.

On the basis of the characteristics of the transmission line 2 measured as above, the master apparatus 100 identifies the transmission line 2. More specifically, on the basis of the measured characteristics, the master apparatus 100 identifies the manufacturer of the transmission line 2, the model number of the transmission line 2, the routing state of the transmission line 2 in the vehicle-mounted network, and so forth.

For example, on the basis of the identification result, the master apparatus 100 adjusts at least either of a transmission operation of a communication signal transmitted to the slave apparatus 200 and a reception operation of a communication signal received from the slave apparatus 200.

More specifically, on the basis of the identification result, the master apparatus 100 adjusts at least either of a communication signal transmitted to the slave apparatus 200 and a communication signal received from the slave apparatus 200.

In addition, for example, the master apparatus 100 transmits a communication signal including identification information indicating the identification result to the slave apparatus 200.

On the basis of the identification information included in the communication signal received from the master apparatus 100, the slave apparatus 200 adjusts at least either of a transmission operation of a communication signal transmitted to the master apparatus 100 and a reception operation of a communication signal received from the master apparatus 100.

Figure 2:
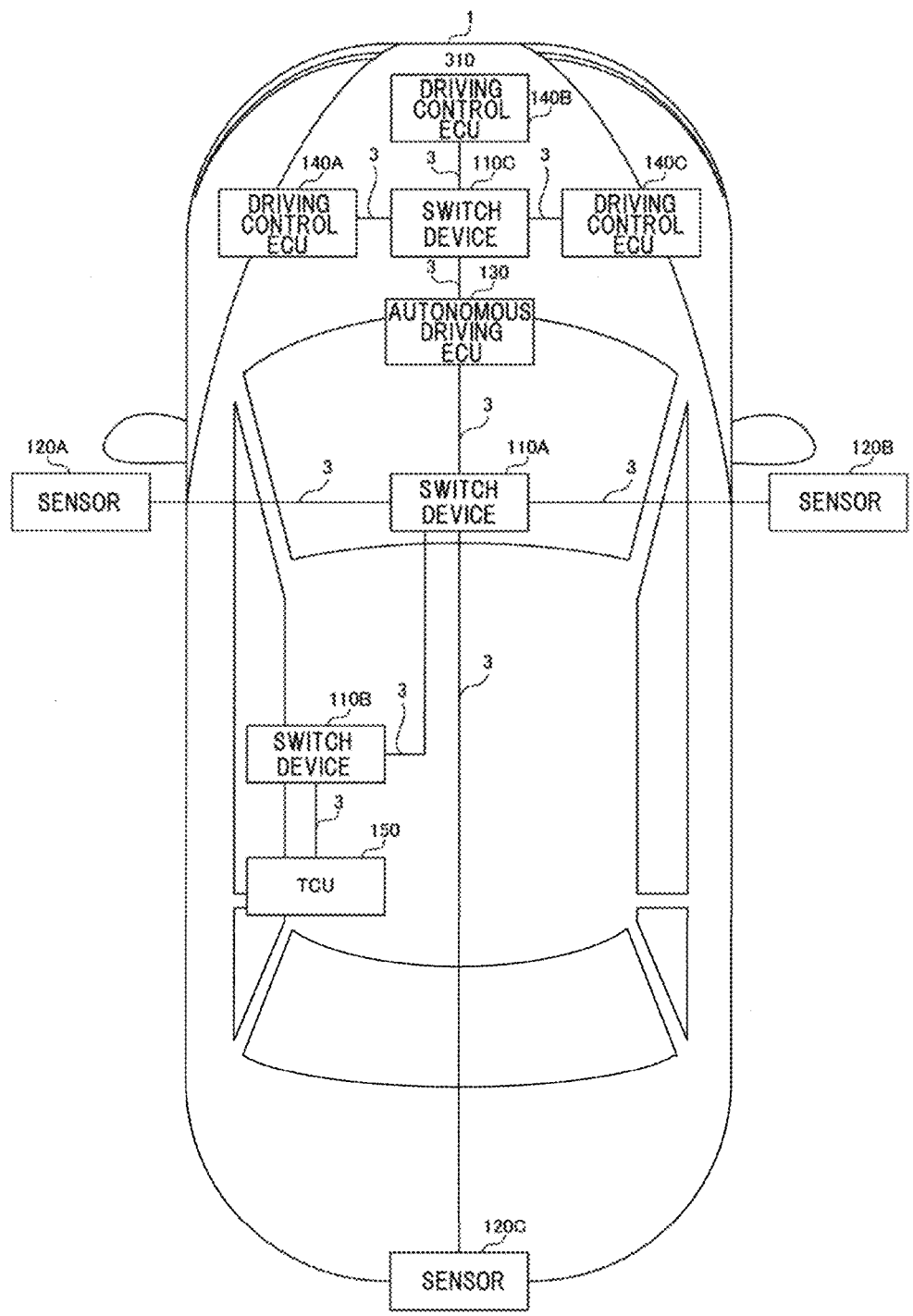
FIG. 2 is a diagram illustrating the configuration of a vehicle-mounted network according to the first embodiment of the present disclosure.

FIG. 2 is a diagram illustrating the configuration of a vehicle-mounted network according to the first embodiment of the present disclosure.

Referring to FIG. 2, a vehicle-mounted network 310 includes switch devices 110A, 110B, and 110C, sensors 120A, 120B, and 120C, an autonomous driving ECU (Electronic Control Unit) 130, driving control ECUs 140A, 140B, and 140C, and a TCU 150. The vehicle-mounted network 310 is mounted in the vehicle 1.

For example, the driving control ECUs 140A, 140B, and 140C are an accelerator control ECU, a brake control ECU, and a steering control ECU, respectively.

Hereinafter, each of the switch devices 110A, 110B, and 110C may also be referred to as a switch device 110. Each of the sensors 120A, 120B, and 120C may also be referred to as a sensor 120. Each of the driving control ECUs 140A, 140B, and 140C may also be referred to as a driving control ECU 140.

The switch devices 110, the sensors 120, the autonomous driving ECU 130, the driving control ECUs 140, and the TCU 150 in the vehicle-mounted network 310 are examples of a vehicle-mounted apparatus. More specifically, these vehicle-mounted apparatuses are examples of the master apparatus 100, as well as examples of the slave apparatus 200.

That is, in this example, a vehicle-mounted apparatus may operate as the master apparatus 100 as well as the slave apparatus 200. Note that a vehicle-mounted apparatus may be configured to operate as either the master apparatus 100 or the slave apparatus 200.

The connection relationship of the switch devices 110, the sensors 120, the autonomous driving ECU 130, the driving control ECUs 140, and the TCU 150 in the vehicle-mounted network 310 is fixed, for example.

The switch device 110A and the switch device 110B are connected to each other via an Ethernet cable 3. The switch device 110A is connected to the sensors 120 and the autonomous driving ECU 130 via Ethernet cables 3. The switch device 110B is connected to the TCU 150 via an Ethernet cable 3. The switch device 110C is connected to the driving control ECUs 140 and the autonomous driving ECU 130 via Ethernet cables 3.

In the vehicle-mounted network 310, data transmission and reception is performed between vehicle-mounted apparatuses. Specifically, in the vehicle-mounted network 310, transmission and reception of Ethernet frames is performed between vehicle-mounted apparatuses in accordance with, for example, the IEEE 802.3 communication standard.

Note that it may be configured in the vehicle-mounted network 310 that data transmission and reception is performed between vehicle-mounted apparatuses in accordance with, besides the IEEE 802.3 communication standard, communication standards such as CAN (Controller Area Network) (registered trademark), FlexRay (registered trademark), MOST (Media Oriented Systems Transport) (registered trademark), and LIN (Local Interconnect Network) (registered trademark).

The switch devices 110 relay Ethernet frames exchanged between vehicle-mounted apparatuses.

The sensors 120 are, for example, detectors that detect an object around the vehicle 1. More specifically, the sensors 120 are, for example, millimeter wave sensors, and measure an object around the vehicle 1 and generate Ethernet frames including sensor information indicating the measurement results.

The sensors 120 transmit the generated Ethernet frames to the autonomous driving ECU 130 via the switch device 110A.

On receipt of the Ethernet frames from the sensors 120 via the switch device 110A, the autonomous driving ECU 130 obtain sensor information from the received Ethernet frames. The autonomous driving ECU 130 detects an object around the vehicle 1 on the basis of measurement results indicated by the sensor information, and controls the driving control ECUs 140 on the basis of the detection result.

Specifically, on the basis of the detection result, the autonomous driving ECU 130 generates Ethernet frames including various types of control information for controlling, for example, the accelerator, brake, and steering of the vehicle 1, and transmits the generated Ethernet frames to the driving control ECUs 140 via the switch device 110C.

On receipt of the Ethernet frames from the autonomous driving ECU 130, the driving control ECUs 140 obtain control information from the received Ethernet frames.

The driving control ECUs 140 control the accelerator, brake, and steering of the vehicle 1 in accordance with the control information.

Having completed the control of the accelerator, brake, and steering of the vehicle 1, the driving control ECUs 140 generate Ethernet frames including completion information indicating that the control has been completed, and transmit the generated Ethernet frames to the autonomous driving ECU 130 via the switch device 110C.

The TCU 150 is capable of communicating with the server 400 outside the vehicle 1. Specifically, referring to FIGS. 1 and 2, the TCU 150 is capable of communicating with the server 400 via, for example, a wireless base station apparatus 420 using an IP packet.

More specifically, the TCU 150 is capable of performing wireless communication with the wireless base station apparatus 420 outside the vehicle 1 in accordance with a communication standard such as LTE (Long Term Evolution) or 3G.

Specifically, on receipt of an IP packet from the server 400 outside the vehicle 1 via an external network 410, the wireless base station apparatus 420 transmits a wireless signal including the received IP packet to the TCU 150.

When the TCU 150 receives, from the wireless base station apparatus 420, a wireless signal including an IP packet from a server, the TCU 150 obtains the IP packet from the received wireless signal, stores the obtained IP packet in an Ethernet frame, and transmits the Ethernet frame to the switch device 110B.

In addition, on receipt of the Ethernet frame from the switch device 110B, the TCU 150 obtains the IP packet from the received Ethernet frame, and transmits a wireless signal including the obtained IP packet to the wireless base station apparatus 420.

On receipt of the wireless signal from the TCU 150, the wireless base station apparatus 420 obtains the IP packet from the received wireless signal, and transmits the obtained IP packet to the server 400 via the external network 410.

[Master Apparatus]

Figure 3:
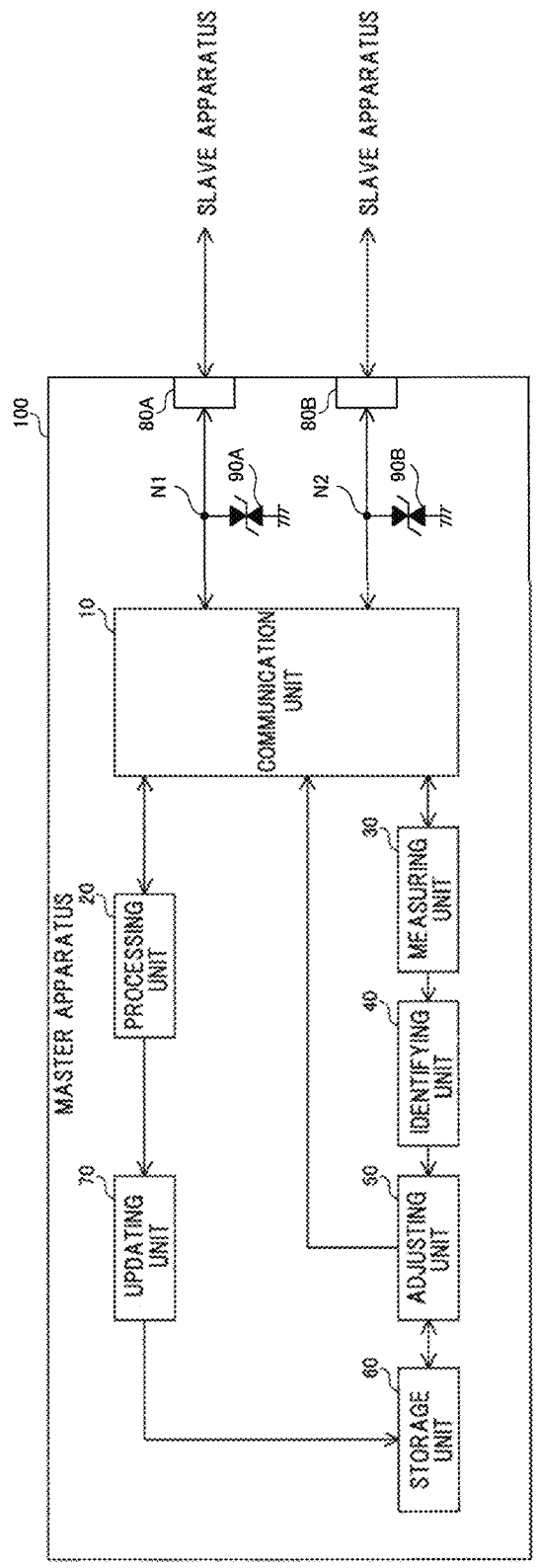
FIG. 3 is a diagram illustrating the configuration of a master apparatus according to the first embodiment of the present disclosure.

FIG. 3 is a diagram illustrating the configuration of a master apparatus according to the first embodiment of the present disclosure.

Referring to FIG. 3, the master apparatus 100 includes a communication unit 10, a processing unit 20, a measuring unit 30, an identifying unit 40, an adjusting unit 50, a storage unit 60, an updating unit 70, communication ports 80A and 80B, and front-end circuits 90A and 90B. The storage unit 60 is flash memory, for example. Note that the storage unit 60 may be configured to be provided outside the master apparatus 100.

The communication ports 80A and 80B are terminals to which, for example, the connectors of Ethernet cables 3 are connectable. Hereinafter, each of the communication ports 80A and 80B may also be referred to as a communication port 80.

The front-end circuit 90A is connected between a node N1 between the communication port 80A and the communication unit 10 and a ground node. The front-end circuit 90B is connected between a node N2 between the communication port 80B and the communication unit 10 and a ground node. Hereinafter, each of the front-end circuits 90A and 90B may also be referred to as a front-end circuit 90.

For example, the front-end circuits 90 are circuits that protect the master apparatus 100 from static electricity and the like. The front-end circuits 90 are configured of, for example, bidirectional Zener diodes.

Note that the master apparatus 100 is not limited to the configuration including two communication ports 80, and the master apparatus 100 may be configured to include one or three or more communication ports 80. For example, the master apparatus 100 may be configured to include communication ports 80 whose number is in accordance with the number of vehicle-mounted apparatuses connected to the master apparatus 100.

Specifically, the switch device 110C, which is an example of the master apparatus 100, includes four communication ports 80 corresponding to the autonomous driving ECU 130 and the driving control ECUs 140, which are vehicle-mounted apparatuses connected to the switch device 110C.

The processing unit 20 outputs an Ethernet frame to be transmitted to another vehicle-mounted apparatus to the communication unit 10.

For example, the processing unit 20 in a sensor 120 serving as the master apparatus 100 generates an Ethernet frame including sensor information indicating a measurement result, and outputs the generated Ethernet frame to the communication unit 10.

Alternatively, the autonomous driving ECU 130 serving as the master apparatus 100 generates Ethernet frames including various types of control information, and outputs the generated Ethernet frames to the communication unit 10.

[Communication Unit]

The communication unit 10 communicates with another vehicle-mounted apparatus via an Ethernet cable 3 connected to the communication unit 10.

More specifically, the communication unit 10 transmits an Ethernet frame received from the processing unit 20 to a vehicle-mounted apparatus corresponding to the MAC (Media Access Control) address of a destination included in the Ethernet frame via a corresponding communication port 80.

In addition, on receipt of an Ethernet frame addressed to the local master apparatus 100 including the communication unit 10 from another vehicle-mounted apparatus via a communication port 80, the communication unit 10 outputs the received Ethernet frame to the processing unit 20.

Figure 4:
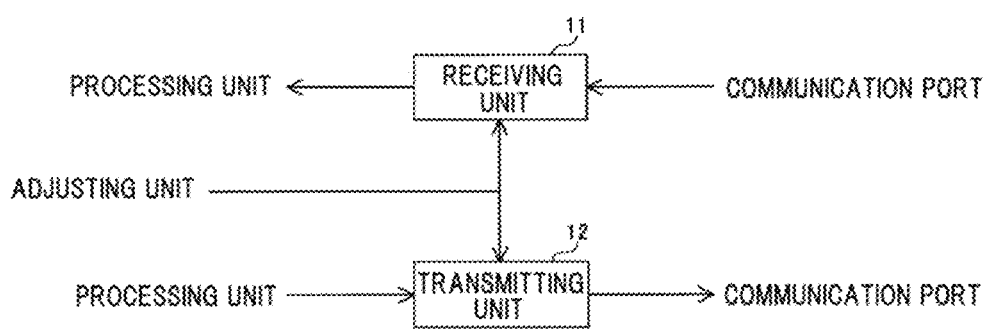
FIG. 4 is a diagram illustrating the configuration of a communication unit according to the first embodiment of the present disclosure.

FIG. 4 is a diagram illustrating the configuration of a communication unit according to the first embodiment of the present disclosure.

Referring to FIG. 4, the communication unit 10 includes a receiving unit 11 and a transmitting unit 12.

On receipt of an Ethernet frame from the processing unit 20, the transmitting unit 12 converts a bit string indicating the received Ethernet frame to a symbol string in accordance with a certain modulation scheme. The transmitting unit 12 generates a communication signal with levels corresponding to the individual symbols of the converted symbol string, sequentially from the first symbol, and transmits the generated communication signal to another vehicle-mounted apparatus via a communication port 80 and an Ethernet cable 3.

The receiving unit 11 receives a communication signal from another vehicle-mounted apparatus via an Ethernet cable 3 and a communication port 80. By demodulating the received communication signal in accordance with a certain modulation scheme, the receiving unit 11 generates a symbol string, and converts the generated symbol string to a bit string, that is, an Ethernet frame. The receiving unit 11 outputs the converted Ethernet frame to the processing unit 20.

On receipt of the Ethernet frame from the communication unit 10, the processing unit 20 performs certain processing using the received Ethernet frame.

For example, the processing unit 20 in the autonomous driving ECU 130 serving as the master apparatus 100 detects an object around the vehicle 1 on the basis of a measurement result indicated by sensor information included in an Ethernet frame from a sensor 120, and, on the basis of the detection result, performs processing to generate Ethernet frames including various types of control information.

The processing unit 20 transmits the generated Ethernet frames to other vehicle-mounted apparatuses, that is, the driving control ECUs 140, via the communication unit 10 and communication ports 80.

Alternatively, for example, the processing unit 20 in a switch device 110 serving as the master apparatus 100 performs processing to relay an Ethernet frame. Specifically, on receipt of an Ethernet frame from a vehicle-mounted apparatus serving as the transmission source via the communication unit 10 and a communication port 80, the processing unit 20 transmits the received Ethernet frame to a vehicle-mounted apparatus serving as the transmission destination via the communication unit 10 and a communication port 80.

The communication unit 10 is capable of communicating with the outside of the vehicle 1. For example, the communication unit 10 is capable of communicating with the server 400.

[Measuring Unit]

Referring back to FIG. 3, the measuring unit 30 measures the characteristics of an Ethernet cable 3 in the vehicle-mounted network 310.

More specifically, the measuring unit 30 measures the characteristics of an Ethernet cable 3 that connects the master apparatus 100 serving as a local vehicle-mounted apparatus and the slave apparatus 200. Hereinafter, each of an Ethernet cable 3 whose characteristics are to be measured by the measuring unit 30 and an Ethernet cable 3 whose characteristics are to be measured by a later-described measuring unit 230 may also be referred to as a target cable.

Having measured the characteristics of a target cable, the measuring unit 30 generates measurement information indicating the measurement result, and outputs the generated measurement information to the identifying unit 40.

For example, the measuring unit 30 measures, as the characteristics of the target cable, the characteristic impedance of the target cable.

More specifically, with termination processing having been done in the slave apparatus 200, the measuring unit 30 measures the characteristic impedance of the target cable using a technique according to TDR.

Specifically, the measuring unit 30 outputs a measurement signal, such as a high-speed pulse signal or step signal, to the target cable via the communication unit 10 and a communication port 80, and receives a reflection signal of the output measurement signal via the communication unit 10 and the communication port 80.

On the basis of the received reflection signal, the measuring unit 30 measures the characteristic impedance of the target cable. The measuring unit 30 outputs measurement information indicating the result of measuring the characteristic impedance of the target cable to the identifying unit 40.

Alternatively, the measuring unit 30 measures, as the characteristics of the target cable, the insertion loss of the target cable.

More specifically, with termination processing having been done in the slave apparatus 200, the measuring unit 30 transmits a plurality of target signals with different frequencies, such as measurement signals, via the communication unit 10 and a communication port 80 to the slave apparatus 200 connected to the local master apparatus 100 via the target cable.

The slave apparatus 200 measures the target signals received from the measuring unit 30 in the master apparatus 100, and transmits response signals indicating the measurement results to the master apparatus 100.

On receipt of the response signals from the slave apparatus 200 via the target cable, the communication port 80, and the communication unit 10, the measuring unit 30 in the master apparatus 100 measures the insertion loss of the target cable using the received response signals and the target signals transmitted by the measuring unit 30.

The measuring unit 30 outputs measurement information indicating the result of measuring the insertion loss of the target cable to the identifying unit 40. The measuring unit 30 outputs measurement information indicating a Touchstone measurement result, for example, to the identifying unit 40.

[Identifying Unit]

The identifying unit 40 identifies the target cable on the basis of the characteristics measured by the measuring unit 30.

More specifically, on receipt of measurement information from the measuring unit 30, the identifying unit 40 identifies the target cable on the basis of the received measurement information.

On the basis of measurement information received from the measuring unit 30, the identifying unit 40 identifies the manufacturer of the target cable, the model number of the target cable, the routing state of the target cable in the vehicle-mounted network 310, and so forth.

The identifying unit 40 identifies, as the routing state of the target cable in the vehicle-mounted network 310, for example, the length and curvature radius of the target cable routed in the vehicle-mounted network 310, force received by binding with another Ethernet cable 3, the length of a portion that runs parallel with another Ethernet cable 3 due to the binding, and whether there is a relay terminal.

For example, the identifying unit 40 detects a change in time domain in the characteristic impedance indicated by the received measurement information, and, on the basis of the detection result, identifies the target cable.

Alternatively, for example, the identifying unit 40 detects the insertion loss indicated by the received measurement information, and, on the basis of the detection result, identifies the target cable.

Figure 5:
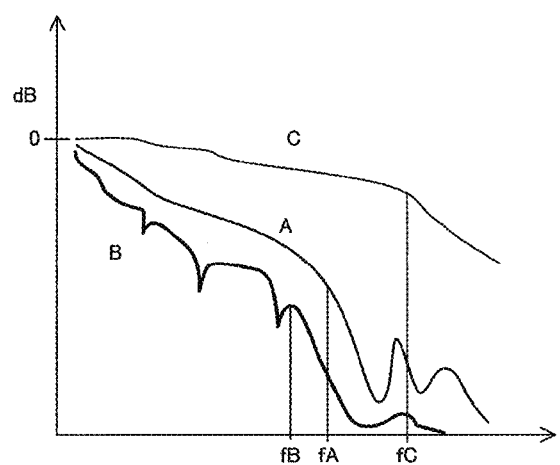
FIG. 5 is a diagram illustrating an example of the result of measuring the insertion loss of an Ethernet cable of the vehicle-mounted communication system according to the first embodiment of the present disclosure.

FIG. 5 is a diagram illustrating an example of the result of measuring the insertion loss of an Ethernet cable in the vehicle-mounted communication system according to the first embodiment of the present disclosure. Note that, in FIG. 5, the ordinate indicates power loss, and the abscissa indicates the frequency of a target signal.

Referring to FIG. 5, insertion loss waveform A indicates the insertion loss of an Ethernet cable 3A, which is manufactured by company X and has a length of 10 m. Insertion loss waveform B in FIG. 5 indicates the insertion loss of an Ethernet cable 3B, which is manufactured by company X, has a length of 10 m, and runs parallel with another Ethernet cable. Insertion loss waveform C in FIG. 5 indicates the insertion loss of an Ethernet cable 3C, which is manufactured by company X and has a length of 5 m.

The insertion loss of an Ethernet cable 3 deteriorates as the frequency of a target signal increases, and deteriorates rapidly at a certain frequency. Hereinafter, the frequency of a target signal at which the insertion loss of an Ethernet cable 3 starts to deteriorate rapidly will be referred to as a suck out frequency.

For example, the thickness of an insulated portion used in each Ethernet cable 3 and the thickness of each Ethernet cable 3 may vary from manufacturer to manufacturer of the Ethernet cables 3.

Therefore, the suck out frequency varies according to, for example, the manufacturer of the Ethernet cable 3. In addition, the suck out frequency may vary according to, for example, the model number of the Ethernet cable 3, and the routing state of the Ethernet cable 3 in the vehicle-mounted network 310.

Specifically, for example, suck out frequency fA of the insertion loss of the Ethernet cable 3A, suck out frequency fB of the insertion loss of the Ethernet cable 3B, and suck out frequency fC of the insertion loss of the Ethernet cable 3C are different from one another.

On the basis of the frequency characteristics of the insertion loss indicated by measurement information received from the measuring unit 30, the identifying unit 40 detects the suck out frequency, and identifies the target cable on the basis of the detected suck out frequency.

Having identified the target cable, the identifying unit 40 generates identification information indicating the identification result, and outputs the generated identification information to the adjusting unit 50.

[Adjusting Unit]

On the basis of the identification result of the identifying unit 40, the adjusting unit 50 performs adjustment processing to adjust at least either of a transmission operation and a reception operation of a communication signal by the communication unit 10. For example, in the adjustment processing, the adjusting unit 50 adjusts both a transmission operation and a reception operation of a communication signal by the communication unit 10.

Referring back to FIG. 4, for example, the transmitting unit 12 in the communication unit 10 is capable of adjusting a communication signal to be transmitted to the slave apparatus 200. In addition, for example, the receiving unit 11 in the communication unit 10 is capable of adjusting a communication signal received from the slave apparatus 200.

The adjusting unit 50 adjusts, as a communication signal transmission operation by the communication unit 10, the contents of correction of a communication signal to be transmitted by the transmitting unit 12 to the slave apparatus 200. In addition, the adjusting unit 50 adjusts, as a communication signal reception operation by the communication unit 10, the contents of correction of a communication signal received by the receiving unit 11 from the slave apparatus 200.

More specifically, the adjusting unit 50 generates, on the basis of an identification result indicated by identification information received from the identifying unit 40, correction information A1 including the correction contents of a communication signal to be transmitted to the slave apparatus 200, and the ID, such as the MAC address, of the slave apparatus 200.

In addition, the adjusting unit 50 generates, on the basis of an identification result indicated by identification information received from the identifying unit 40, correction information A2 including the correction contents of a communication signal received from the slave apparatus 200, and the ID, such as the MAC address, of the slave apparatus 200.

The adjusting unit 50 outputs the generated correction information A1 and correction information A2 to the communication unit 10.

On receipt of the correction information A2 from the adjusting unit 50, the receiving unit 11 holds the received correction information A2. In accordance with the correction contents included in the held correction information A2, the receiving unit 11 corrects a communication signal received via a communication port 80 from the slave apparatus 200 corresponding to the MAC address included in the correction information A2.

For example, the receiving unit 11 includes a compensation circuit such as an equalizer circuit or a DFE (Decision Feedback Equalizer) circuit.

By correcting a communication signal received from the slave apparatus 200 in accordance with the correction contents included in the correction information A2, the compensation circuit in the receiving unit 11 corrects the frequency characteristics of the target cable in the band of the communication signal.

On receipt of the correction information A1 from the adjusting unit 50, the transmitting unit 12 holds the received correction information A1. In accordance with the correction contents included in the held correction information A1, the transmitting unit 12 corrects a communication signal addressed to the slave apparatus 200 corresponding to the MAC address included in the correction information A1, which is received from the processing unit 20.

For example, the transmitting unit 12 includes a compensation circuit such as a pre-emphasis circuit or a de-emphasis circuit.

By correcting a communication signal addressed to the slave apparatus 200 in accordance with the correction contents included in the correction information A1, the compensation circuit in the transmitting unit 12 corrects the frequency characteristics of the target cable in the band of the communication signal.

For example, the storage unit 60 stores correspondence information indicating the corresponding relationship between an identification result and an operation parameter regarding adjustment processing.

FIG. 6 is a diagram illustrating an example of correspondence information in a storage unit according to the first embodiment of the present disclosure.

Referring to FIG. 6, the storage unit 60 stores correspondence information indicating the corresponding relationship between an Ethernet cable identification result and an operation parameter. For example, the storage unit 60 stores the above-mentioned corresponding relationship for each manufacturer of the compensation circuit in the communication unit 10, each manufacturer of the front-end circuit 90, each manufacturer of the communication port 80, and each manufacturer of the slave apparatus 200.

For example, the storage unit 60 stores, as the operation parameter, a correction parameter indicating a magnification factor for the receiving unit 11 to amplify a communication signal and a magnification factor for the transmitting unit 12 to amplify a communication signal.

The adjusting unit 50 performs adjustment processing using the correspondence information in the storage unit 60.

More specifically, on receipt of identification information from the identifying unit 40, the adjusting unit 50 refers to the correspondence information in the storage unit 60, thereby obtaining a correction parameter corresponding to an identification result indicated by the identification information.

The adjusting unit 50 generates correction information A1 and correction information A2 including magnification factors for amplifying a communication signal, which are indicated by the obtained correction parameter, and outputs the generated correction information A1 and A2 to the communication unit 10.

In the case where the operation parameter corresponding to the identification result indicates "correction unrequired" in the correspondence information, the adjusting unit 50 may be configured to output the correction information A1 and correction information A2 indicating that the correction of a communication signal is not required to the communication unit 10, or may be configured not to output the correction information A1 and correction information A2 to the communication unit 10.

In addition, the adjusting unit 50 may be configured to transmit the correction information A1 and correction information A2 to the slave apparatus 200 via the communication unit 10.

[Updating Unit]

The updating unit 70 updates the correspondence information in the storage unit 60 on the basis of information received from the outside of the vehicle 1 via the communication unit 10.

The server 400 holds correspondence information for each model number of the vehicle 1, for example. The correspondence information in the server 400 is updated periodically or irregularly.

By communicating with the server 400 upon shipment of the vehicle 1, for example, the TCU 150 receives the latest correspondence information from the server 400. In addition, by periodically communicating with the server 400 after shipment of the vehicle 1, the TCU 150 receives the latest correspondence information from the server 400.

The TCU 150 transmits the latest correspondence information received from the server 400 to another vehicle-mounted apparatus.

On receipt of the correspondence information from the TCU 150 via the communication unit 10, the processing unit 20 in the vehicle-mounted apparatus in the vehicle-mounted network 310 outputs the received correspondence information to the updating unit 70.

On receipt of the correspondence information from the processing unit 20, the updating unit 70 updates the correspondence information in the storage unit 60 using the received correspondence information.

Here, the characteristics of each Ethernet cable 3 in the vehicle-mounted network 310 may change over time, for example.

The measuring unit 30 measures the characteristics of an Ethernet cable 3 in the vehicle-mounted network 310 upon a certain calibration trigger, such as turning on an accessory of the vehicle 1, turning on the ignition of the vehicle 1, initializing a vehicle-mounted apparatus, changing the configuration of the vehicle-mounted network 310, and the occurrence of a communication error in the vehicle-mounted network 310.

The identifying unit 40 identifies the Ethernet cable 3 on the basis of the characteristics measured by the measuring unit 30.

On the basis of the identification result of the identifying unit 40, the adjusting unit 50 generates correction information A1 and correction information A2, and outputs the generated correction information A1 and correction information A2 to the communication unit 10.

[Slave Apparatus]

FIG. 7 is a diagram illustrating an example of the configuration of a slave apparatus according to the first embodiment of the present disclosure.

Referring to FIG. 7, the slave apparatus 200 includes a communication unit 210, a processing unit 220, a measuring unit 230, communication ports 280A and 280B, and front-end circuits 290A and 290B. Hereinafter, each of the communication ports 280A and 280B may also be referred to as a communication port 280, and each of the front-end circuits 290A and 290B may also be referred to as a front-end circuit 290.

Note that the slave apparatus 200 is not limited to the configuration including two communication ports 280, and the slave apparatus 200 may be configured to include one or three or more communication ports 280. For example, the slave apparatus 200 may be configured to include communication ports 280 whose number is in accordance with the number of vehicle-mounted apparatuses connected to the slave apparatus 200.

The functions and operation of the processing unit 220 are the same as or similar to the functions and operation of the processing unit 20 in the master apparatus 100.

Like the communication unit 10 in the master apparatus 100, the communication unit 210 communicates with another vehicle-mounted apparatus via an Ethernet cable 3 connected to the slave apparatus 200.

On receipt of a plurality of target signals with different frequencies from the master apparatus 100, the communication unit 210 outputs the received target signals to the measuring unit 230.

On receipt of the target signals from the communication unit 210, the measuring unit 230 measures the received target signals, and transmits response signals indicating the measurement results to the master apparatus 100 via the communication unit 210.

Figure 8:
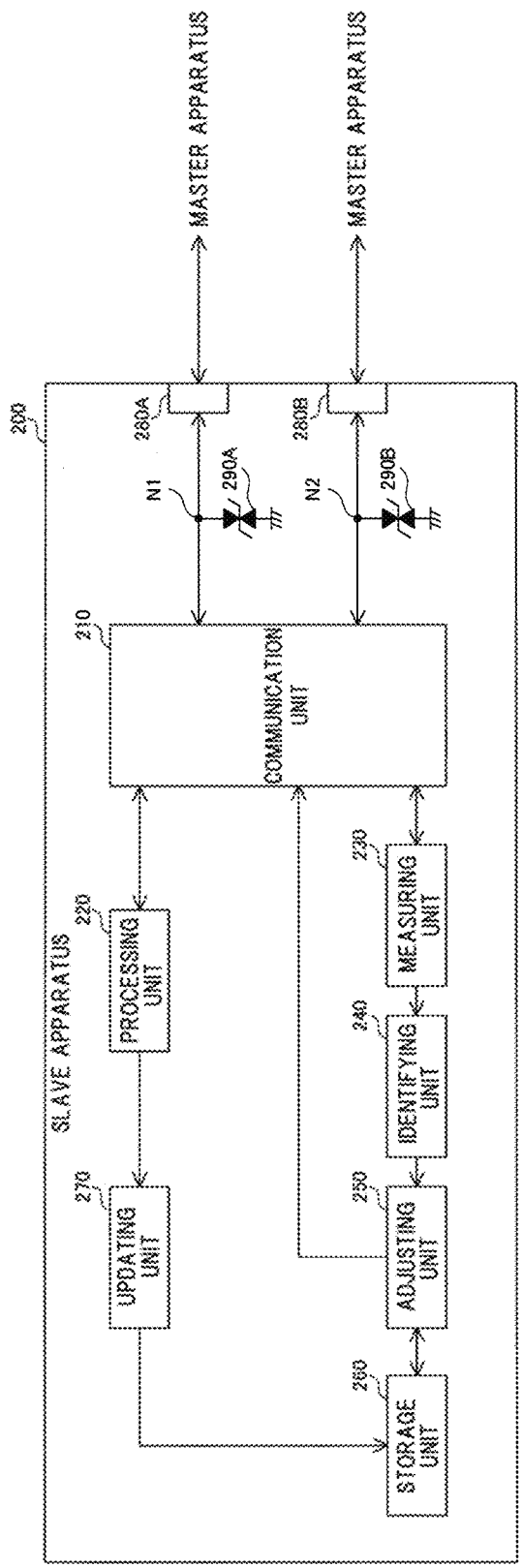
FIG. 8 is a diagram illustrating another example of the configuration of the slave apparatus according to the first embodiment of the present disclosure.

FIG. 8 is a diagram illustrating another example of the configuration of the slave apparatus according to the first embodiment of the present disclosure.

Referring to FIG. 8, the slave apparatus 200 includes the communication unit 210, the processing unit 220, the measuring unit 230, an identifying unit 240, an adjusting unit 250, a storage unit 260, an updating unit 270, the communication ports 280, and the front-end circuits 290. The storage unit 260 is flash memory, for example. Note that the storage unit 260 may be configured to be provided outside the master apparatus 200.

The functions and operation of the measuring unit 230 are the same as or similar to the functions and operation of the measuring unit 30 in the master apparatus 100 except for the fact that the measuring unit 230 transmits a response signal indicating the result of measuring a target signal received from the communication unit 210 to the master apparatus 100 via the communication unit 210.

The functions and operation of the communication unit 210, processing unit 220, identifying unit 240, adjusting unit 250, storage unit 260, and updating unit 270 are respectively the same as or similar to the functions and operation of the communication unit 10, processing unit 20, identifying unit 40, adjusting unit 50, storage unit 60, and the updating unit 70 in the master apparatus 100.

On receipt of the correction information A1 from the master apparatus 100, the transmitting unit 12 in the communication unit 210 corrects a communication signal addressed to the master apparatus 100, received from the processing unit 20, in accordance with correction contents included in the correction information A1.

On receipt of the correction information A2 from the master apparatus 100, the receiving unit 11 in the communication unit 210 corrects a communication signal received from the master apparatus 100 via a communication port 80 in accordance with correction contents included in the correction information A2.

[Flow of Operation]

Each apparatus in the communication system according to the embodiment of the present disclosure includes a computer including memory, and an arithmetic processing unit such as a CPU in the computer reads from the memory a program including some or all of the steps of the following flowchart and sequence, and executes the program. Programs for these apparatuses may be installed from the outside. Each of the programs for these apparatuses is distributed as being stored in a recording medium.

Figure 9:
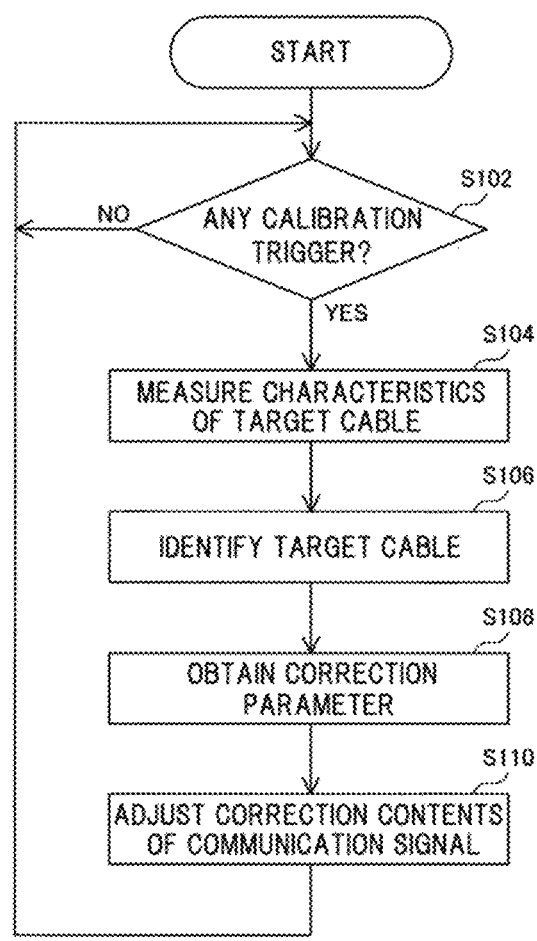
FIG. 9 is a flowchart defining the operation procedure when the master apparatus adjusts a transmission operation and a reception operation in the vehicle-mounted communication system according to the first embodiment of the present disclosure.

FIG. 9 is a flowchart defining the operation procedure when the master apparatus adjusts a transmission operation and a reception operation in the vehicle-mounted communication system according to the first embodiment of the present disclosure.

Referring to FIG. 9, the master apparatus 100 first waits for a certain calibration trigger, such as turning on an accessory of the vehicle 1 (NO in step S102), and, in response to the occurrence of a calibration trigger, measures the characteristics of a target cable in the vehicle-mounted network 310 (step S104).

Next, the master apparatus 100 identifies the manufacturer of the target cable, the model number of the target cable, the routing state of the target cable in the vehicle-mounted network 310, and so forth (step S106).

Next, the master apparatus 100 obtains a correction parameter corresponding to the identification result on the basis of the correspondence information in the storage unit 60 (step S108).

Next, the master apparatus 100 adjusts the correction contents of a to-be-transmitted communication signal and a received communication signal on the basis of the obtained correction parameter (step S110).

Next, the master apparatus 100 waits for a new calibration trigger (NO in step S102).

Figure 10:
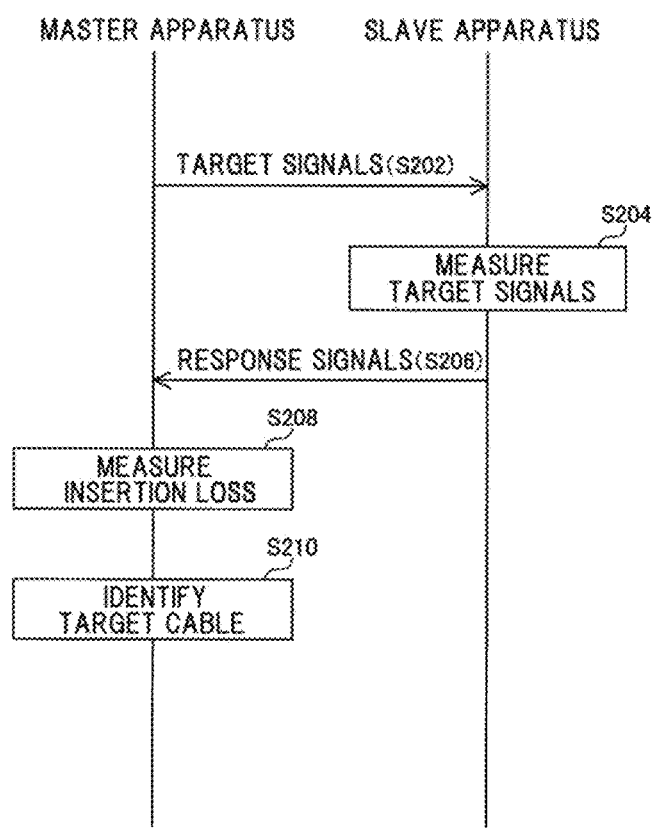
FIG. 10 is a diagram illustrating an example of the sequence of a process of identifying a target cable in the vehicle-mounted communication system according to the first embodiment of the present disclosure.

FIG. 10 is a diagram illustrating an example of the sequence of a process of identifying a target cable in the vehicle-mounted communication system according to the first embodiment of the present disclosure.

Referring to FIG. 10, the master apparatus 100 first transmits target signals to the slave apparatus 200 via a target cable (step S202).

Next, the slave apparatus 200 measures the target signals received from the master apparatus 100 (step S204).

Next, the slave apparatus 200 transmits response signals indicating the results of measuring the target signals to the master apparatus 100 (step S206).

Next, the master apparatus 100 measures the insertion loss of the target cable on the basis of the target signals transmitted by the master apparatus 100 and the measurement results indicated by the response signals received from the slave apparatus 200 (step S208).

Next, the master apparatus 100 identifies the manufacturer of the target cable, the model number of the target cable, the routing state of the target cable in the vehicle-mounted network 310, and so forth on the basis of the frequency characteristics of the measured insertion loss (step S210).

In the master apparatus 100 according to the first embodiment of the present disclosure, although the adjusting unit 50 is configured to perform, on the basis of the identification result of the identifying unit 40, adjustment processing to adjust a transmission operation and a reception operation of a communication signal by the communication unit 10, this is not the only possible configuration. The adjusting unit 50 may be configured to adjust either a transmission operation or a reception operation of a communication signal by the communication unit 10.

In addition, the master apparatus 100 may be configured not to include the adjusting unit 50. In this case, the master apparatus 100 may be configured to include an output unit that outputs the identification result of the identifying unit 40 to the outside of the vehicle 1.

In addition, in the master apparatus 100 according to the first embodiment of the present disclosure, although the storage unit 60 is configured to store correspondence information indicating the corresponding relationship between an identification result and an operation parameter, this is not the only possible configuration. The storage unit 60 may be configured not to store the correspondence information. In this case, the adjusting unit 50 performs adjustment processing using, for example, an operation parameter generated by an external apparatus outside the vehicle 1 on the basis of an identification result output to the external apparatus.

In addition, in the master apparatus 100 according to the first embodiment of the present disclosure, although the updating unit 70 is configured to update the correspondence information on the basis of information received from the outside of the vehicle 1 via the communication unit 10, this is not the only possible configuration. The master apparatus 100 may be configured not to include the updating unit 70.

In addition, in the master apparatus 100 according to the first embodiment of the present disclosure, although the updating unit 70 is configured to update correspondence information in the storage unit 60 using correspondence information received from the server 400 via the TCU 150 and the communication unit 10, this is not the only possible configuration. The updating unit 70 may be configured to update correspondence information in the storage unit 60 using, for example, correspondence information received via the communication unit 10 from an external apparatus connected to the vehicle-mounted network 310 by DoIP (Diagnostics over Internet Protocol).

By the way, technology capable of improving functions regarding a transmission line in a vehicle-mounted network is desired.

For example, the communication quality of a vehicle-mounted network may be lowered by the influence of distortion of communication signals in a transmission line as a result of an increase in the transmission amount and the transmission speed of communication signals in the vehicle-mounted network, and of noise sources and heat sources.

In contrast, the master apparatus 100 according to the first embodiment of the present disclosure is mounted in the vehicle 1. In the master apparatus 100, the measuring unit 30 measures the characteristics of a transmission line in the vehicle-mounted network 310 mounted in the vehicle 1. The identifying unit 40 identifies the transmission line on the basis of characteristics measured by the measuring unit 30.

As mentioned above, with the configuration of identifying a transmission line in the vehicle-mounted network 310 on the basis of the characteristics of the transmission line, namely, the result of measuring the electrical characteristics of a low layer, the components and the like of the transmission line may be identified, and various appropriate processes and so forth in accordance with the identification result may be implemented.

Therefore, functions regarding a transmission line in a vehicle-mounted network may be improved in the master apparatus 100 according to the first embodiment of the present disclosure.

In addition, in the master apparatus 100 according to the first embodiment of the present disclosure, the communication unit 10 communicates with the slave apparatus 200 via a transmission line. On the basis of the identification result of the identifying unit 40, the adjusting unit 50 adjusts at least either of a transmission operation and a reception operation of a communication signal by the communication unit 10.

With such a configuration, the frequency characteristics of a transmission line in the band of a communication signal, for example, may be compensated for in accordance with the identification result. Accordingly, the communication quality of the vehicle-mounted network 310 may be improved.

In addition, in the master apparatus 100 according to the first embodiment of the present disclosure, the adjusting unit 50 adjusts a transmission operation and a reception operation in adjustment processing.

With such a configuration, both the quality of a communication signal to be transmitted from the slave apparatus 200 to the master apparatus 100 and the quality of a communication signal to be transmitted from the master apparatus 100 to the slave apparatus 200 may be improved. Accordingly, the quality of communication between the master apparatus 100 and the slave apparatus 200 may be further improved.

In addition, in the master apparatus 100 according to the first embodiment of the present disclosure, the storage unit 60 stores correspondence information indicating the corresponding relationship between an identification result and an operation parameter regarding adjustment processing. The adjusting unit 50 performs adjustment processing using the correspondence information.

With such a configuration, adjustment processing may be performed using the pre-generated corresponding relationship between an identification result and an operation parameter. Accordingly, the adjustment processing may be simplified.

In addition, in the master apparatus 100 according to the first embodiment of the present disclosure, the communication unit 10 is further capable of communicating with the outside of the vehicle 1. The updating unit 70 updates the correspondence information on the basis of information received from the outside of the vehicle 1 via the communication unit 10.

With such a configuration, a verification result in another vehicle 1, for example, may be reflected in adjustment processing in the local vehicle 1. Accordingly, the accuracy of adjustment processing by the adjusting unit 50 may be improved.

In addition, the vehicle-mounted communication system 300 according to the first embodiment of the present disclosure includes the master apparatus 100 mounted in the vehicle 1, and the slave apparatus 200 mounted in the vehicle 1. The master apparatus 100 and the slave apparatus 200 are connected via a transmission line in the vehicle-mounted network 310 mounted in the vehicle 1. The master apparatus 100 transmits a target signal to the slave apparatus 200 via a transmission line. The slave apparatus 200 measures the target signal received from the master apparatus 100, and transmits a response signal indicating the measurement result to the master apparatus 100. On the basis of the response signal received from the slave apparatus 200, the master apparatus 100 measures the characteristics of the transmission line. The master apparatus 100 identifies the transmission line on the basis of the measured characteristics.

As mentioned above, with the configuration of identifying a transmission line that connects the master apparatus 100 and the slave apparatus 200 in the vehicle-mounted network 310 on the basis of the characteristics of the transmission line, namely, the result of measuring the electrical characteristics of a low layer, the components and the like of the transmission line between the master apparatus 100 and the slave apparatus 200 may be identified, and various appropriate processes and so forth in accordance with the identification result may be implemented.

Therefore, functions regarding a transmission line in a vehicle-mounted network may be improved in the vehicle-mounted communication system 300 according to the first embodiment of the present disclosure.

In addition, a communication management method according to the first embodiment of the present disclosure is a communication management method for the master apparatus 100 mounted in the vehicle 1. In the communication management method, the master apparatus 100 first measures the characteristics of a transmission line in the vehicle-mounted network 310 mounted in the vehicle 1. Next, the master apparatus 100 identifies the transmission line on the basis of the measured characteristics.

As mentioned above, with the method of identifying a transmission line in the vehicle-mounted network 310 on the basis of the characteristics of the transmission line, namely, the result of measuring the electrical characteristics of a low layer, the components and the like of the transmission line may be identified, and various appropriate processes and so forth in accordance with the identification result may be implemented.

Therefore, functions regarding a transmission line in a vehicle-mounted network may be improved in the communication management method according to the first embodiment of the present disclosure.

In addition, a communication management method according to the first embodiment of the present disclosure is a communication management method for the vehicle-mounted communication system 300 including the master apparatus 100 mounted in the vehicle 1 and the slave apparatus 200 mounted in the vehicle, and the master apparatus 100 and the slave apparatus 200 are connected via a transmission line in the vehicle-mounted network 310 mounted in the vehicle 1. In the communication management method, the master apparatus 100 first transmits a target signal to the slave apparatus 200 via a transmission line. Next, the slave apparatus 200 transmits a response signal indicating the result of measuring the target signal received from the master apparatus 100 to the master apparatus 100. Next, the master apparatus 100 measures the characteristics of the transmission line on the basis of the measurement result received from the slave apparatus 200. Next, the master apparatus 100 identifies the transmission line on the basis of the measured characteristics.

As mentioned above, with the method of identifying a transmission line that connects the master apparatus 100 and the slave apparatus 200 in the vehicle-mounted network 310 on the basis of the characteristics of the transmission line, namely, the result of measuring the electrical characteristics of a low layer, the components and the like of the transmission line between the master apparatus 100 and the slave apparatus 200 may be identified, and various appropriate processes and so forth in accordance with the identification result may be implemented.

Therefore, functions regarding a transmission line in a vehicle-mounted network may be improved in the communication management method according to the first embodiment of the present disclosure.

Next, another embodiment of the present disclosure will be described using the drawings. Note that the same or corresponding portions in the drawings will be denoted by the same reference symbol, and a repeated description thereof will not be given.

Second Embodiment

The present embodiment relates to, compared with the vehicle-mounted communication system according to the first embodiment, a vehicle-mounted communication system capable of adjusting the correction contents of a to-be-transmitted communication signal in accordance with the quality of communication between vehicle-mounted apparatuses. Things other than the contents described below are the same as or similar to the vehicle-mounted communication system according to the first embodiment.

[Communication System]

Figure 11:
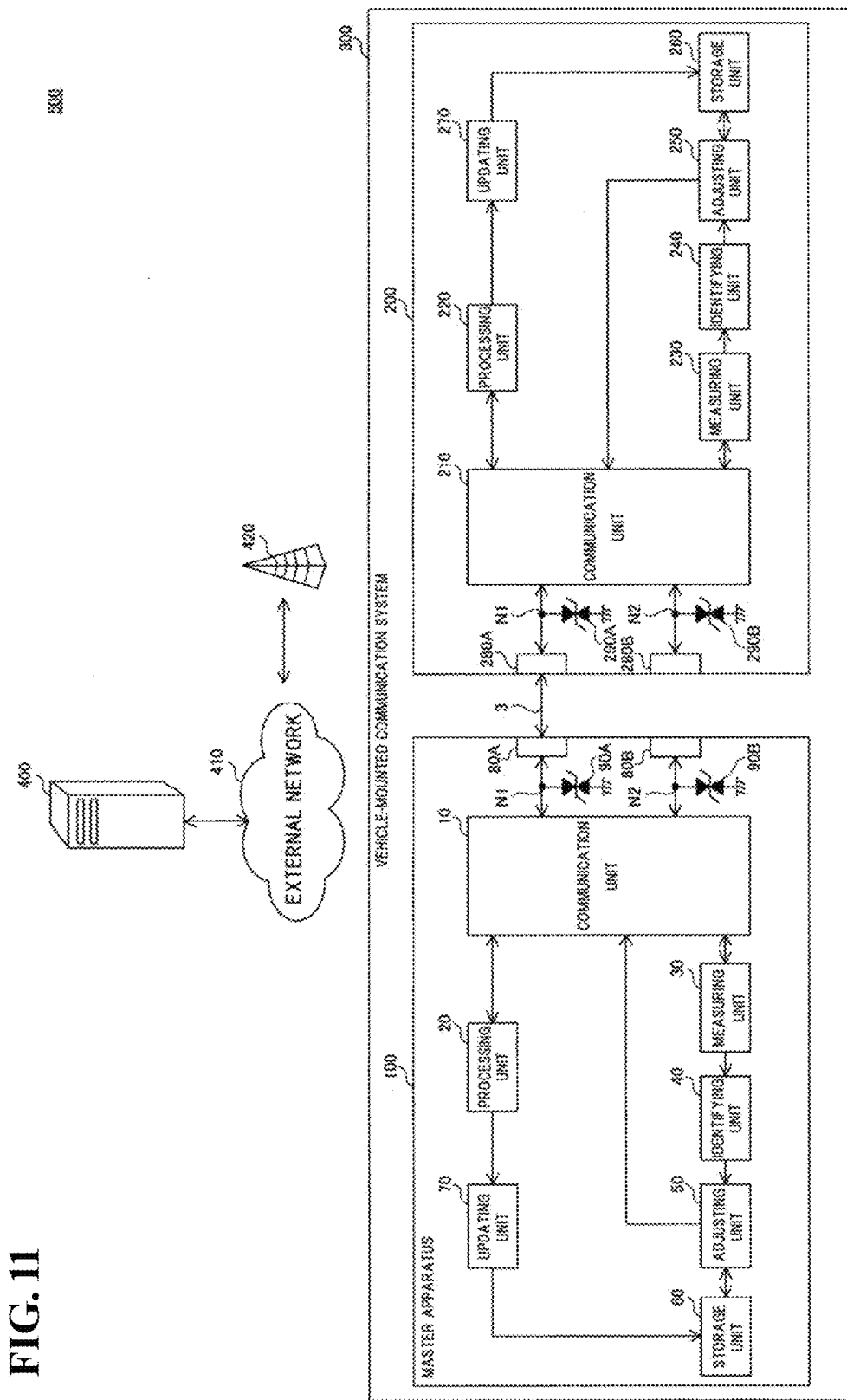
FIG. 11 is a diagram illustrating the configuration of a communication system according to a second embodiment of the present disclosure.

FIG. 11 is a diagram illustrating the configuration of a communication system according to a second embodiment of the present disclosure.

Referring to FIG. 11, a communication system 500 includes a server 400, and one or more vehicle-mounted communication systems 300. Each vehicle-mounted communication system 300 is mounted in a vehicle 1.

The vehicle-mounted communication system 300 includes a master apparatus 100 and a slave apparatus 200. The master apparatus 100 and the slave apparatus 200 are connected via an Ethernet cable 3.

The master apparatus 100 includes a communication unit 10, a processing unit 20, a measuring unit 30, an identifying unit 40, an adjusting unit 50, a storage unit 60, an updating unit 70, communication ports 80, and front-end circuits 90.

The slave apparatus 200 includes a communication unit 210, a processing unit 220, a measuring unit 230, an identifying unit 240, an adjusting unit 250, a storage unit 260, an updating unit 270, communication ports 280, and front-end circuits 290.

The adjusting unit 50 in the master apparatus 100 obtains an evaluation result regarding the quality of communication by the communication unit 10 from the communication unit 10.

In addition, the adjusting unit 250 in the slave apparatus 200 obtains an evaluation result regarding the quality of communication by the communication unit 210 from the communication unit 210.

More specifically, the adjusting unit 50 in the master apparatus 100 evaluates the quality of communication between the master apparatus 100 and the slave apparatus 200.

For example, the communication unit 10 measures the BER (Bit Error Rate) of an Ethernet frame transmitted from the slave apparatus 200 to the master apparatus 100, and outputs the measurement result as an evaluation result regarding the quality of communication by the communication unit 10 to the adjusting unit 50.

In the master apparatus 100, in the case where the BER received from the communication unit 10 is greater than a certain threshold, the adjusting unit 50 transmits an adjustment command indicating that the correction information is to be adjusted to the slave apparatus 200 via the communication unit 10.

On receipt of the adjustment command from the master apparatus 100, the communication unit 210 in the slave apparatus 200 outputs the received adjustment command as an evaluation result regarding the quality of communication by the communication unit 210 to the adjusting unit 250.

In addition, the adjusting unit 250 in the slave apparatus 200 evaluates the quality of communication between the master apparatus 100 and the slave apparatus 200.

For example, the communication unit 210 measures the BER of an Ethernet frame transmitted from the master apparatus 100 to the slave apparatus 200, and outputs the measurement result as an evaluation result regarding the quality of communication by the communication unit 210 to the adjusting unit 250.

In the slave apparatus 200, in the case where the BER received from the communication unit 210 is greater than a certain threshold, the adjusting unit 250 transmits an adjustment command indicating that the correction information is to be adjusted to the master apparatus 100 via the communication unit 210.

On receipt of the adjustment command from the slave apparatus 200, the communication unit 10 in the master apparatus 100 outputs the received adjustment command as an evaluation result regarding the quality of communication by the communication unit 10 to the adjusting unit 50.

[Adjustment Processing]

In the master apparatus 100, in the case where the BER received from the communication unit 10 is greater than a certain threshold, or in the case where the adjustment command is received from the slave apparatus 200 via the communication unit 10, the adjusting unit 50 performs adjustment processing to adjust at least either of a transmission operation and a reception operation of a communication signal by the communication unit 10, and of a transmission operation and a reception operation of a communication signal by the communication unit 210 in the slave apparatus 200.

In the slave apparatus 200, in the case where the BER received from the communication unit 210 is greater than a certain threshold, or in the case where the adjustment command is received from the master apparatus 100 via the communication unit 210, the adjusting unit 250 performs adjustment processing to adjust at least either of a transmission operation and a reception operation of a communication signal by the communication unit 210, or a transmission operation or a reception operation of a communication signal by the communication unit 10 in the master apparatus 100.

First Example of Adjustment Processing

For example, as the adjustment processing, the adjusting unit 50 in the master apparatus 100 transmits an Ethernet frame including a random test pattern to the slave apparatus 200 via the communication unit 10 at a certain cycle until the adjustment processing in the slave apparatus 200 is terminated. Hereinafter, an Ethernet frame including a test pattern may also be referred to as a test frame.

As the adjustment processing, the adjusting unit 250 in the slave apparatus 200 monitors the BER received from the communication unit 210, generates correction information A2 for reducing the BER of a test frame received by the communication unit 210 from the master apparatus 100, and outputs the correction information A2 to the receiving unit 11 in the communication unit 210, thereby updating the correction information A2 held by the receiving unit 11.

More specifically, while monitoring the BER of a test frame received by the communication unit 210 from the master apparatus 100, the adjusting unit 250 adjusts the correction information A2 to be output to the receiving unit 11 in the communication unit 210.

When the BER of a test frame received by the communication unit 210 from the master apparatus 100 becomes less than or equal to the certain threshold, the adjusting unit 250 terminates the adjustment of the correction information A2 to be output to the receiving unit 11 in the communication unit 210, thereby terminating the update of the correction information A2 in the receiving unit 11, and fixing the correction parameter of the compensation circuit in the receiving unit 11.

In addition, the adjusting unit 250 transmits adjustment termination information indicating that the adjustment processing has been terminated to the master apparatus 100 via the communication unit 210.

On receipt of the adjustment termination information from the slave apparatus 200 via the communication unit 10, the adjusting unit 50 in the master apparatus 100 stops transmitting a test frame.

Next, having terminated the adjustment of the correction information A2 to be output to the receiving unit 11 in the communication unit 210, the adjusting unit 250 in the slave apparatus 200 transmits a test frame to the master apparatus 100 via the communication unit 210 at a certain cycle until the adjustment processing in the master apparatus 100 is terminated.

As the adjustment processing, the adjusting unit 50 in the master apparatus 100 monitors the BER received from the communication unit 10, generates correction information A2 for reducing the BER of a test frame received by the communication unit 10 from the slave apparatus 200, and outputs the correction information A2 to the receiving unit 11 in the communication unit 10, thereby updating the correction information A2 held by the receiving unit 11.

More specifically, while monitoring the BER of a test frame received by the communication unit 10 from the slave apparatus 200, the adjusting unit 50 adjusts the correction information A2 to be output to the receiving unit 11 in the communication unit 10.

When the BER of a test frame received by the communication unit 10 from the slave apparatus 200 becomes less than or equal to the certain threshold, the adjusting unit 50 terminates the adjustment of the correction information A2 to be output to the receiving unit 11 in the communication unit 10, thereby terminating the update of the correction information A2 in the receiving unit 11, and fixing the correction parameter of the compensation circuit in the receiving unit 11.

In addition, the adjusting unit 50 transmits an adjustment termination command indicating that the adjustment processing is to be terminated to the slave apparatus 200 via the communication unit 10.

On receipt of the adjustment termination information from the master apparatus 100 via the communication unit 210, the adjusting unit 250 in the slave apparatus 200 stops transmitting a test frame.

Second Example of Adjustment Processing

As the adjustment processing, for example, the adjusting unit 50 in the master apparatus 100 transmits a test frame to the slave apparatus 200 via the communication unit 10. The test frame may include transmission power information.

As the adjustment processing, the adjusting unit 250 in the slave apparatus 200 monitors the BER received from the communication unit 210, and transmits reception information including the BER of a test frame received by the communication unit 210 from the master apparatus 100 to the master apparatus 100 via the communication unit 210.

The communication unit 10 in the master apparatus 100 outputs the reception information received from the slave apparatus 200 to the adjusting unit 50.

The adjusting unit 50 generates correction information A1 for reducing the BER included in the reception information received from the communication unit 10 and outputs the correction information A1 to the transmitting unit 12 in the communication unit 10, thereby updating the correction information A1 held by the transmitting unit 12.

More specifically, while monitoring the BER of the reception information received from the communication unit 10, the adjusting unit 50 adjusts the correction information A1 to be output to the transmitting unit 12 in the communication unit 10.

When the BER of the reception information received from the communication unit 10 becomes less than or equal to a certain threshold, the adjusting unit 50 terminates the adjustment of the correction information A1 to be output to the transmitting unit 12 in the communication unit 10, thereby terminating the update of the correction information A1 in the transmitting unit 12, and fixing the correction parameter of the compensation circuit in the transmitting unit 12.

In addition, the adjusting unit 50 transmits adjustment termination information indicating that the adjustment processing has been terminated to the slave apparatus 200 via the communication unit 10.

Next, the communication unit 210 in the slave apparatus 200 outputs the adjustment termination information received from the master apparatus 100 to the adjusting unit 250.

On receipt of the adjustment termination information from the communication unit 210, the adjusting unit 250 transmits, as the adjustment processing, a test frame to the master apparatus 100 via the communication unit 210. The test frame may include transmission power information.

As the adjustment processing, the adjusting unit 50 in the master apparatus 100 monitors the BER received from the communication unit 10, and transmits reception information including the BER of a test frame received by the communication unit 10 from the slave apparatus 200 to the slave apparatus 200 via the communication unit 10.

The communication unit 210 in the slave apparatus 200 outputs the reception information received from the master apparatus 100 to the adjusting unit 250.

The adjusting unit 250 generates correction information A1 for reducing the BER included in the reception information received from the communication unit 210 and outputs the correction information A1 to the transmitting unit 12 in the communication unit 210, thereby updating the correction information A1 held by the transmitting unit 12.

More specifically, while monitoring the BER of the reception information received from the communication unit 210, the adjusting unit 250 adjusts the correction information A1 to be output to the transmitting unit 12 in the communication unit 210.

When the BER of the reception information received from the communication unit 210 becomes less than or equal to a certain threshold, the adjusting unit 250 terminates the adjustment of the correction information A1 to be output to the transmitting unit 12 in the communication unit 210, thereby terminating the update of the correction information A1 in the transmitting unit 12, and fixing the correction parameter of the compensation circuit in the transmitting unit 12.

In addition, the adjusting unit 250 transmits adjustment termination information indicating that the adjustment processing has been terminated to the master apparatus 100 via the communication unit 210.

For example, the adjusting unit 50 in the master apparatus 100 updates the correspondence information on the basis of an evaluation result regarding the quality of communication by the communication unit 10.

More specifically, the adjusting unit 50 in the master apparatus 100 updates, with the adjustment processing, the correspondence information in the storage unit 60 using the correction information A1 adjusted on the basis of the BER of the communication unit 210 in the slave apparatus 200 and the correction information A2 adjusted on the basis of the BER of the communication unit 10.

In addition, the adjusting unit 250 in the slave apparatus 200 updates the correspondence information on the basis of an evaluation result regarding the quality of communication by the communication unit 210.

More specifically, the adjusting unit 250 in the slave apparatus 200 updates, with the adjustment processing, the correspondence information in the storage unit 260 using the correction information A1 adjusted on the basis of the BER of the communication unit 10 in the master apparatus 100 and the correction information A2 adjusted on the basis of the BER of the communication unit 210.

The communication unit 10 in the master apparatus 100 transmits the correspondence information updated by the adjusting unit 50 to an apparatus outside the vehicle 1. The communication unit 210 in the slave apparatus 200 transmits the correspondence information updated by the adjusting unit 250 to an apparatus outside the vehicle 1.

More specifically, the adjusting unit 50 in the master apparatus 100 and the adjusting unit 250 in the slave apparatus 200 each transmit update information including the updated correspondence information to an external apparatus such as the server 400 via the TCU 150 and the wireless base station apparatus 420.

For example, the adjusting unit 50 and the adjusting unit 250 each generate update information including the updated correspondence information, the ID of the vehicle-mounted apparatus, the temperature of the vehicle-mounted apparatus measured by a temperature sensor, the position information of the vehicle 1 detected by a GPS (Global Positioning System) apparatus, and meteorological information such as the temperature and humidity at the current position of the vehicle 1, and transmit the generated update information to the server 400 via the TCU 150 and the wireless base station apparatus 420.

FIG. 12 is a diagram illustrating an example of correspondence information in a server of the communication system according to the second embodiment of the present disclosure.

Referring to FIG. 12, the server 400 stores correspondence information indicating the corresponding relationship between an Ethernet cable identification result and an operation parameter. For example, the server 400 stores the above-mentioned corresponding relationship for each manufacturer of the compensation circuit in the communication unit 10, each manufacturer of the front-end circuit 90, each manufacturer of the communication port 80, each manufacturer of the vehicle-mounted apparatus, each temperature of the vehicle-mounted apparatus, each ID of the vehicle-mounted apparatus connected by the Ethernet cable, and each outside-vehicle environment such as temperature and humidity.

The administrator of the server 400 updates the correspondence information held by the server 400 on the basis of update information received by the server 400 from the master apparatus 100 and the slave apparatus 200 via the TCU 150 and the wireless base station apparatus 420.

For example, the administrator of the server 400 analyzes the update information received by the server 400, thereby verifying the accuracy of the update information, and updating the correspondence information held by the server 400 on the basis of the verification result.

In addition, the administrator of the server 400 may also send the verification result as a feedback for newly designing and developing a vehicle-mounted network 310.

As described above, in the communication system 500, the master apparatus 100 and the slave apparatus 200 each transmit update information including the updated correspondence information to the server 400. The administrator of the server 400 updates the correspondence information in the server 400 using the update information.

With such a configuration, the correspondence information in the server 400 may be updated to appropriate contents actually usable in the vehicle-mounted communication system 300.

Accordingly, by updating the correspondence information in the vehicle-mounted communication system 300 of another vehicle 1 using the updated correspondence information in the server 400, the accuracy of adjustment of a transmission operation and a reception operation by a communication unit in the vehicle-mounted communication system 300 of this other vehicle 1 may be improved.

In particular, by updating the correspondence information in the server 400 using numerous pieces of update information transmitted from the master apparatus 100 and the slave apparatus 200 in the vehicle-mounted communication system 300 of each vehicle 1 for commercial use, whose driving time and driving distance are long, the correspondence information in the server 400 may be updated to more appropriate contents.

In addition, when the master apparatus 100 and the slave apparatus 200 each transmit update information including the ID of the vehicle-mounted apparatus and the temperature of the vehicle-mounted apparatus to the server 400, the server 400 may generate correspondence information indicating the corresponding relationship which takes into consideration the inside-vehicle environment of the vehicle 1.

In addition, when the master apparatus 100 and the slave apparatus 200 each transmit update information including the position information of the vehicle 1 and meteorological information at the current position of the vehicle 1 to the server 400, correspondence information indicating the corresponding relationship which takes into consideration the outside-vehicle environmental factors may be generated.

Figure 13:
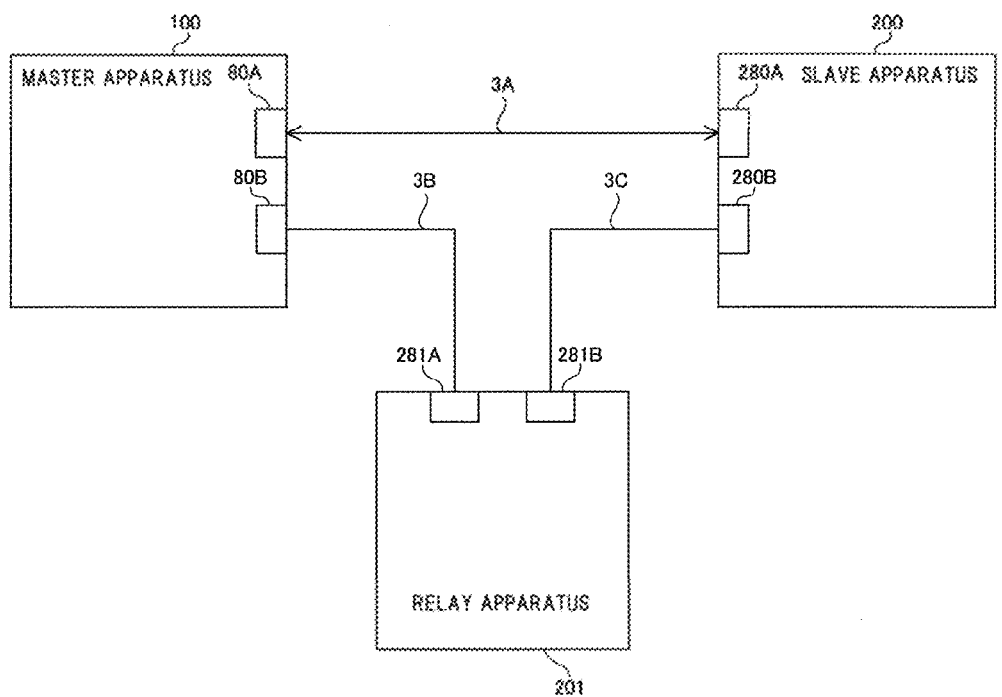
FIG. 13 is a diagram illustrating an example of the configuration of a vehicle-mounted communication system according to the second embodiment of the present disclosure.

FIG. 13 is a diagram illustrating an example of the configuration of a vehicle-mounted communication system according to the second embodiment of the present disclosure.

Referring to FIG. 13, the vehicle-mounted communication system 300 includes a master apparatus 100, a slave apparatus 200, and a relay apparatus 201. The master apparatus 100, the slave apparatus 200, and the relay apparatus 201 form a ring-shaped topology.

More specifically, the master apparatus 100 includes communication ports 80A and 80B. The slave apparatus 200 includes communication ports 280A and 280B. The relay apparatus 201 includes communication ports 281A and 281B.

The communication port 80A in the master apparatus 100 and the communication port 280A in the slave apparatus 200 are connected via an Ethernet cable 3A. The communication port 80B in the master apparatus 100 and the communication port 281A in the relay apparatus 201 are connected via an Ethernet cable 3B. The communication port 280B in the slave apparatus 200 and the communication port 281B in the relay apparatus 201 are connected via an Ethernet cable 3C.

For example, while performing adjustment processing by transmitting a test frame via the Ethernet cable 3A, the master apparatus 100 and the slave apparatus 200 perform communication via the relay apparatus 201 in parallel with the adjustment processing.

More specifically, the master apparatus 100 transmits, among Ethernet frames addressed to the slave apparatus 200, Ethernet frames other than a test frame to the relay apparatus 201 via the Ethernet cable 3B.

The relay apparatus 201 transfers the Ethernet frames addressed to the slave apparatus 200, which are received from the master apparatus 100, to the slave apparatus 200 via the Ethernet cable 3C.

The slave apparatus 200 transmits, among Ethernet frames addressed to the master apparatus 100, Ethernet frames other than a test frame to the relay apparatus 201 via the Ethernet cable 3C.

The relay apparatus 201 transfers the Ethernet frames addressed to the master apparatus 100, which are received from the slave apparatus 200, to the master apparatus 100 via the Ethernet cable 3B.

As mentioned above, because the vehicle-mounted communication system 300 is configured to allow, while adjustment processing is being performed between the master apparatus 100 and the slave apparatus 200, communication to be performed via a redundant path, adjustment processing and communication may be performed in parallel.

Note that, in the master apparatus 100 according to the second embodiment of the present disclosure, although the communication unit 10 is configured to transmit correspondence information updated by the adjusting unit 50 to an external apparatus such as the server 400, this is not the only possible configuration. The communication unit 10 may be configured not to transmit correspondence information updated by the adjusting unit 50 to an external apparatus.

As described above, in the master apparatus 100 according to the second embodiment of the present disclosure, the adjusting unit 50 obtains an evaluation result regarding the quality of communication by the communication unit 10 from the communication unit 10, updates correspondence information indicating the corresponding relationship between an identification result and an operation parameter regarding adjustment processing on the basis of the obtained evaluation result, and performs adjustment processing using the updated correspondence information. The communication unit 10 transmits the updated correspondence information to an apparatus outside the vehicle 1.

As mentioned above, with the configuration of updating the correspondence information in the master apparatus 100 of the local vehicle 1 and transmitting the updated correspondence information to an apparatus outside the vehicle 1, the correspondence information may be updated by taking into consideration the inside-vehicle environment of the local vehicle 1, and, for example, the updated correspondence information may be reflected in adjustment processing in another vehicle 1.

It should be considered that the above-described embodiments are exemplary in all respects and are not restrictive. The scope of the present invention is indicated not by the above description but by the claims, and is intended to include all changes within the meaning and scope equivalent to the claims.

The above description includes features described below.

APPENDIX 1

A vehicle-mounted apparatus mounted in a vehicle, comprising:
    a measuring unit that measures characteristics of a transmission line in a vehicle-mounted network mounted in the vehicle; and
    an identifying unit that identifies a component of the transmission line based on the characteristics measured by the measuring unit.

The above description includes features described below.

APPENDIX 2

A vehicle-mounted communication system comprising:
    a first vehicle-mounted apparatus mounted in a vehicle; and
    a second vehicle-mounted apparatus mounted in the vehicle, wherein:
    the first vehicle-mounted apparatus and the second vehicle-mounted apparatus are connected via a transmission line in a vehicle-mounted network mounted in the vehicle,
    the first vehicle-mounted apparatus transmits a target signal to the second vehicle-mounted apparatus via the transmission line,
    the second vehicle-mounted apparatus measures the target signal received from the first vehicle-mounted apparatus, and transmits a response signal indicating a measurement result to the first vehicle-mounted apparatus,
    the first vehicle-mounted apparatus measures characteristics of the transmission line based on the response signal received from the second vehicle-mounted apparatus, and
    the first vehicle-mounted apparatus identifies a component of the transmission line based on the measured characteristics.

REFERENCE SIGNS LIST 1 vehicle
2 transmission line
3 Ethernet cable (target cable)
10 communication unit
11 receiving unit
12 transmitting unit
20 processing unit
30 measuring unit
40 identifying unit
50 adjusting unit
60 storage unit
70 updating units
80 communication ports
90 front-end circuits
100 master apparatus 110 switch devices
120 sensors
130 autonomous driving ECU
140 driving control ECUs
150 TCU
200 slave apparatus
201 relay apparatus
210 communication unit
220 processing unit
230 measuring unit
240 identifying unit
250 adjusting unit
260 storage unit
270 updating unit
280 communication ports
281 communication ports
290 front-end circuits
300 vehicle-mounted communication system
310 vehicle-mounted network
400 server
410 external network
420 wireless base station apparatus
500 communication system

The invention claimed is:

1. A vehicle-mounted apparatus mounted in a vehicle, comprising:
a measuring circuit configured to measure characteristics of a transmission line in a vehicle-mounted network mounted in the vehicle;
an identifying circuit configured to identify the transmission line based on the characteristics measured by the measuring circuit;
a communication circuit configured to communicate with another vehicle-mounted apparatus via the transmission line; and
an adjusting circuit configured to, based on an identification result of the identifying circuit, perform adjustment processing to adjust at least a transmission operation or a reception operation of a communication signal by the communication circuit, wherein
the adjusting circuit is configured to obtain an evaluation result regarding quality of communication by the communication circuit from the communication circuit, update correspondence information indicating a corresponding relationship between the identification result and an operation parameter regarding the adjustment processing based on the obtained evaluation result, and perform the adjustment processing using the updated correspondence information.

2. The vehicle-mounted apparatus according to claim 1, wherein the adjusting circuit is configured to adjust both the transmission operation and the reception operation in the adjustment processing.

3. The vehicle-mounted apparatus according to claim 1, further comprising:
a memory configured to store correspondence information indicating a corresponding relationship between the identification result and an operation parameter regarding the adjustment processing,
wherein the adjusting circuit is configured to perform the adjustment processing using the correspondence information.

4. The vehicle-mounted apparatus according to claim 3, wherein:
the vehicle-mounted apparatus further comprises:
an updating circuit configured to update the correspondence information based on information received from outside of the vehicle via the communication circuit.

5. The vehicle-mounted apparatus according to claim 1, wherein:
the communication circuit is configured to transmit the updated correspondence information to an apparatus outside the vehicle.

6. A vehicle-mounted communication system comprising:
a first vehicle-mounted apparatus mounted in a vehicle; and
a second vehicle-mounted apparatus mounted in the vehicle, wherein:
the first vehicle-mounted apparatus and the second vehicle-mounted apparatus are connected via a transmission line in a vehicle-mounted network mounted in the vehicle,
the first vehicle-mounted apparatus is configured to transmit a target signal to the second vehicle-mounted apparatus via the transmission line,
the second vehicle-mounted apparatus is configured to measure the target signal received from the first vehicle-mounted apparatus, and transmit a response signal indicating a measurement result to the first vehicle-mounted apparatus,
the first vehicle-mounted apparatus is configured to measure characteristics of the transmission line based on the response signal received from the second vehicle-mounted apparatus, and
the first vehicle-mounted apparatus is configured to identify the transmission line based on the measured characteristics.

7. The vehicle-mounted communication system according to claim 6, further comprising circuitry configured to adjust at least one of transmit operation performed by the first vehicle-mounted apparatus or a receive operation performed by the second vehicle mounted apparatus based on the measured characteristics.

8. The vehicle-mounted communication system according to claim 7, wherein the circuitry is further configured to adjust both the transmit operation and the receive operation.

9. The vehicle-mounted communication system according to claim 7, further comprising:
a data storage device configured to store correspondence information indicating a corresponding relationship between the measured characteristics and an operation parameter regarding adjustment processing performed to adjust the at least one of the transmit operation and the receive operation,
wherein the circuitry is further configured to perform the adjustment processing using the correspondence information.

10. The vehicle-mounted communication system according to claim 9, wherein
the first vehicle-mounted apparatus is configured to transmit a message to another device outside the vehicle, and
the circuitry is further configured to update the correspondence information based on information received from the another device in response to the message that is transmitted to the another device.

11. The vehicle-mounted communication system according to claim 7, wherein
the circuitry is configured to
obtain an evaluation result regarding quality of communication by the first vehicle-mounted apparatus from the first vehicle-mounted apparatus, update correspondence information indicating a corresponding relationship between the measured characteristics and an operation parameter regarding the adjustment processing based on the obtained evaluation result, and adjust at least one of transmit operation performed by the first vehicle-mounted apparatus or a receive operation performed by the second vehicle mounted apparatus based on the updated correspondence information, and the first vehicle-mounted apparatus is configured to transmit updated correspondence information to another apparatus that is outside the vehicle.

12. A communication management method for a vehicle-mounted apparatus mounted in a vehicle, comprising the steps of:

measuring characteristics of a transmission line in a vehicle-mounted network mounted in the vehicle;

identifying the transmission line based on the measured characteristics;

communicating with another vehicle-mounted apparatus via the transmission line; and based on an identification result of the transmission line, adjusting either of a transmission operation or a reception operation of a communication signal, wherein the adjusting includes:
obtaining an evaluation result regarding quality of communication, updating correspondence information indicating a corresponding relationship between the identification result and an operation parameter regarding the adjusting based on the obtained evaluation result, and performing the adjusting using the updated correspondence information.

13. The method according to claim 6, wherein the adjusting includes adjusting both the transmission operation and the reception operation.

14. The method according to claim 12, further comprising:

storing correspondence information indicating a corresponding relationship between the identification result and an operation parameter regarding the adjusting, wherein the adjusting includes processing using the correspondence information.

15. The method according to claim 14, further comprising:

updating the correspondence information based on information received from outside of the vehicle.

16. The method according to claim 12, wherein the method further comprises transmitting the updated correspondence information to an apparatus outside the vehicle.

17. A communication management method for a vehicle-mounted communication system including a first vehicle-mounted apparatus mounted in a vehicle and a second vehicle-mounted apparatus mounted in the vehicle, the first vehicle-mounted apparatus and the second vehicle-mounted apparatus being connected via a transmission line in a vehicle-mounted network mounted in the vehicle, the method comprising the steps of:

transmitting, by the first vehicle-mounted apparatus, a target signal to the second vehicle-mounted apparatus via the transmission line;

transmitting, by the second vehicle-mounted apparatus, a response signal indicating a measurement result of the target signal received from the first vehicle-mounted apparatus to the first vehicle-mounted apparatus;

measuring, by the first vehicle-mounted apparatus, characteristics of the transmission line based on the measurement result received from the second vehicle-mounted apparatus; and identifying, by the first vehicle-mounted apparatus, the transmission line based on the measured characteristics.

* * * * *

UNITED STATES PATENT AND TRADEMARK OFFICE
CERTIFICATE OF CORRECTION

| | |
|---|---|
| PATENT NO. | : 11,956,316 B2 |
| APPLICATION NO. | : 17/764535 |
| DATED | : April 9, 2024 |
| INVENTOR(S) | : Toshihiro Ichimaru |

It is certified that error appears in the above-identified patent and that said Letters Patent is hereby corrected as shown below:

In the Claims

Column 31, Line 35, after "claim" delete "6" and insert --12--.

Signed and Sealed this
Twenty-fifth Day of June, 2024

Katherine Kelly Vidal
*Director of the United States Patent and Trademark Office*